US012492480B2

(12) United States Patent
Hu et al.

(10) Patent No.: US 12,492,480 B2
(45) Date of Patent: Dec. 9, 2025

(54) SMART CARBON FIBER REINFORCED POLYMER-SHAPE MEMORY ALLOY BAR REINFORCED CONCRETE STRUCTURE INTEGRATING CATHODIC PROTECTION, FORCE SENSING, AND BEARING CAPACITY SELF-ADJUSTMENT

(71) Applicant: Shenzhen University, Shenzhen (CN)

(72) Inventors: Biao Hu, Shenzhen (CN); Yingwu Zhou, Shenzhen (CN); Zenghui Ye, Shenzhen (CN); Feng Xing, Shenzhen (CN); Xiaoxu Huang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/181,405

(22) Filed: Apr. 17, 2025

(65) Prior Publication Data
US 2025/0333850 A1 Oct. 30, 2025

(30) Foreign Application Priority Data
Apr. 26, 2024 (CN) ......................... 202410508400.7

(51) Int. Cl.
*C23F 13/22* (2006.01)
*C23F 13/16* (2006.01)
(Continued)

(52) U.S. Cl.
CPC ............. *C23F 13/22* (2013.01); *C23F 13/16* (2013.01); *G01L 1/242* (2013.01); *G01L 5/00* (2013.01)

(58) Field of Classification Search
CPC ..................... C04B 2111/265; G01L 1/242
See application file for complete search history.

(56) References Cited

U.S. PATENT DOCUMENTS
2019/0390353 A1   12/2019   Al Hariri et al.

FOREIGN PATENT DOCUMENTS
CN   215330419 U   12/2021
CN   117846222 A   4/2024
CN   117868298 A   4/2024

OTHER PUBLICATIONS

Zheng et al ("Shape memory alloy-carbon fiber reinforced polymer system for strengthening fatigue-sensitive metallic structures", Engineering Structures, vol. 171, 2018, pp. 190-201) (Year: 2018).*

(Continued)

*Primary Examiner* — Alexander W Keeling
(74) *Attorney, Agent, or Firm* — Bayramoglu Law Offices LLC

(57) ABSTRACT

A smart carbon fiber reinforced polymer (CFRP)-shape memory alloy (SMA) bar reinforced concrete structure integrating cathodic protection, force sensing, and bearing capacity self-adjustment is provided. A CFRP-wrapped composite bar with SMA embedded with an optical fiber in the smart CFRP-SMA bar reinforced concrete structure is both a concrete reinforced bar and an auxiliary anode for ICCP to prevent steel bars from being rusted. In addition, the SMA has an ability to adjust stress after excitation, and the embedded optical fiber can perceive a force condition of the composite bar. This structure system significantly improves durability of a concrete structure in a coastal environment, solves problems of in-service real-time bar sensing and bearing capacity control of the structure, and provides a new solution to performance degradation caused by deterioration of a CFRP anode in a traditional ICCP process.

1 Claim, 5 Drawing Sheets

(51) Int. Cl.
    *G01L 1/24*           (2006.01)
    *G01L 5/00*           (2006.01)

(56) References Cited

OTHER PUBLICATIONS

Lee-Orantes et al ("Cathodic Protection in Reinforced Concrete Elements, using Carbon Fibers Base Composites", 2007 ECS Trans. 3 93) (Year: 2007).*

* cited by examiner

SMART CARBON FIBER REINFORCED POLYMER-SHAPE MEMORY ALLOY BAR REINFORCED CONCRETE STRUCTURE INTEGRATING CATHODIC PROTECTION, FORCE SENSING, AND BEARING CAPACITY SELF-ADJUSTMENT

CROSS REFERENCE TO THE RELATED APPLICATIONS

This application is based upon and claims priority to Chinese Patent Application No. 202410508400.7, filed on Apr. 26, 2024, the entire contents of which are incorporated herein by reference.

TECHNICAL FIELD

The present disclosure relates to the technical field of concrete, and specifically, to a smart carbon fiber reinforced polymer (CFRP)-shape memory alloy (SMA) bar reinforced concrete structure integrating cathodic protection, force sensing, and bearing capacity self-adjustment.

BACKGROUND

The impressed current cathodic protection (ICCP) technology is considered an effective control method for preventing steel bars from being rusted. The ICCP technology is one of the methods used to prevent damage to metals (such as pipelines and steel bars) in coastal infrastructure due to corrosion. The ICCP technology controls a current applied on a metal surface to make the metal surface become a cathode, thereby reducing or preventing corrosion. Commonly-used auxiliary anodes are aluminum, magnesium, and zinc, which are easy to install, have good electrochemical activity, and can provide effective cathodic protection. However, these auxiliary anodes have a fast corrosion rate and are consumables that need to be frequently replaced.

SUMMARY

In view of this, an objective of the present disclosure is to provide a smart CFRP-SMA bar reinforced concrete structure integrating cathodic protection, force sensing, and bearing capacity self-adjustment. In the smart CFRP-SMA bar reinforced concrete structure, a CFRP-wrapped composite bar with SMA embedded with an optical fiber, which integrates cathodic protection, force sensing, stress adjustment, and structural enhancement, is a multifunctional smart reinforcement material, which is both a concrete reinforced bar and an auxiliary anode for ICCP to prevent steel bars from being rusted. In addition, the SMA has the ability to adjust stress after excitation, and the embedded optical fiber can perform self-sensing on a force condition of the reinforcement material. This structure system effectively solves problems of durability and in-service real-time smart sensing and bearing capacity control of the concrete structure in a coastal environment and also solves a problem of performance degradation caused by CFRP deterioration in a traditional ICCP process.

To achieve the above objective, the present disclosure provides the following technical solutions.

The present disclosure provides a smart CFRP-SMA bar reinforced concrete structure integrating cathodic protection, force sensing, and bearing capacity self-adjustment, including an impressed current cathodic protection (ICCP) system and an ICCP system deterioration enhancement system, where the ICCP system includes a reinforcing cage, concrete, a CFRP-wrapped composite bar with SMA embedded with an optical fiber, steel bars, and a first external power supply, where the reinforcing cage is placed in the concrete, the CFRP-wrapped composite bar with the SMA embedded with the optical fiber and the steel bars are dispersed in the concrete, a CFRP winding layer of the CFRP-wrapped composite bar with the SMA embedded with the optical fiber is connected to a positive terminal of the first external power supply through a wire, and the steel bars are connected to a negative terminal of the first external power supply through wires;

the ICCP system deterioration enhancement system includes a second external power supply;

a positive terminal and a negative terminal of the second external power supply are respectively connected to two ends of a plain round Fe-SMA bar of the CFRP-wrapped composite bar with the SMA embedded with the optical fiber through wires;

the first external power supply is configured to provide direct current (DC) power for the ICCP system; and the second external power supply is an excitation device for the plain round Fe-SMA bar.

Preferably, a voltage of the first external power supply ranges from 5 V to 20 V.

Preferably, a current of the first external power supply ranges from 200 mA to 3 A.

Preferably, the reinforcing cage is made of ribbed bars.

The present disclosure further provides a preparation method for the smart CFRP-SMA bar reinforced concrete structure in the above technical solutions, including the following steps:

placing a reinforcing cage with a built-in CFRP-wrapped composite bar with SMA embedded with an optical fiber and built-in steel bars in a mold, pouring the concrete, and performing curing;

connecting the CFRP winding layer of the CFRP-wrapped composite bar with the SMA embedded with the optical fiber to the positive terminal of the first external power supply through a wire, and connecting the steel bars to the negative terminal of the first external power supply through wires; and respectively connecting two ends of the plain round Fe-SMA bar of the CFRP-wrapped composite bar with the SMA embedded with the optical fiber to the positive terminal and the negative terminal of a second external power supply through the wires.

The present disclosure further provides an enhancement method for the deterioration of an ICCP system, including the following steps:

applying an excitation current to the plain round Fe-SMA bar of the CFRP-wrapped composite bar with the SMA embedded with the optical fiber in the smart CFRP-SMA bar reinforced concrete structure in the above technical solutions or in the smart CFRP-SMA bar reinforced concrete structure prepared by using the preparation method in the above technical solutions, such that the CFRP-wrapped composite bar with the SMA embedded with the optical fiber generates pretightening force, where the pretightening force makes a contribution $\Delta M$ to a bearing capacity of the smart CFRP-SMA bar reinforced concrete structure, thereby enhancing the deterioration of the ICCP system; where a method for applying the excitation current includes:
applying the excitation current to the plain round Fe-SMA bar of the CFRP-wrapped composite bar with the SMA embedded with the optical fiber after the CFRP winding layer deteriorates when the ICCP system is turned on, or directly applying the excitation current to the plain round Fe-SMA bar of the CFRP-wrapped composite bar with the SMA embedded with the optical fiber when the CFRP winding layer does not deteriorate before the ICCP system is turned on, where
when strain $\varepsilon_f$ of the CFRP winding layer after a normal service load is applied is greater than strain $\varepsilon_{fa}$ of the CFRP winding layer when the excitation current is applied, and power-on time T of the ICCP system is less than or equal to a service life $t_{life}$ of the smart CFRP-SMA bar reinforced concrete structure, the excitation current is applied to the plain round Fe-SMA bar of the CFRP-wrapped composite bar with the SMA embedded with the optical fiber after the CFRP winding layer deteriorates when the ICCP system is turned on; and the strain of the CFRP winding layer is continuously monitored when $\varepsilon_f \leq \varepsilon_{fa}$, or the process is ended because a requirement for safe use is not met when $\varepsilon_f > \varepsilon_{fa}$ and $T > t_{life}$; or when the excitation current is directly applied to the plain round Fe-SMA bar of the CFRP-wrapped composite bar with the SMA embedded with the optical fiber when the CFRP winding layer does not deteriorate before the ICCP system is turned on, a bearing capacity $M_{i1}$ of the smart CFRP-SMA bar reinforced concrete structure after the pretightening force is applied in an initial design stage is calculated, where $M_{i1}$ is equal to a sum of the contribution $\Delta M$ generated by the pretightening force to the bearing capacity and an initial bearing capacity $M_i$ of the smart CFRP-SMA bar reinforced concrete structure; after the excitation current is applied, the ICCP system is turned on; and when $M_{i1} \geq M_a$, the strain of the CFRP winding layer is continuously monitored; or when $M_{i1} < M_a$, the strain of the CFRP winding layer is monitored, and if $\varepsilon_f > \varepsilon_{fa}$ and $T \leq t_{life}$, the excitation current is continuously applied to the plain round Fe-SMA bar of the CFRP-wrapped composite bar with the SMA embedded with the optical fiber; and a value of the excitation current satisfies: average strain $\Delta \varepsilon_{sp}$ of the CFRP-wrapped composite bar with the SMA embedded with the optical fiber after the excitation current is applied is greater than or equal to a difference between the strain $\varepsilon_{fa}$ of the CFRP winding layer when the excitation current is applied and strain $\varepsilon_{fi}$ of the CFRP winding layer when the normal load is initially applied, and the contribution $\Delta M$ generated by the pretightening force to the bearing capacity is greater than or equal to a difference between the initial bearing capacity $M_i$ of the smart CFRP-SMA bar reinforced concrete structure and the designed bearing capacity $M_a$ of the smart CFRP-SMA bar reinforced concrete structure for normal use.

Preferably, a calculation formula for the service life of the smart CFRP-SMA bar reinforced concrete structure is obtained according to formula I:

$$t_{life} = A_a q_{anode} / \left( i_p \sqrt{4\pi n A_c \rho} \right) \quad \text{Formula I}$$

where in the formula I, $t_{life}$ represents the service life of the smart CFRP-SMA bar reinforced concrete structure; $A_a$ represents surface area per unit length of the CFRP winding layer of the CFRP-wrapped composite bar with the SMA embedded with the optical fiber; $q_{anode}$ represents the density of an electric quantity passing through the CFRP winding layer, which is $1.6 \times 10^7$ C/m², where under the value, an anode reaction system is stable and residual strength efficiency of an anode material of the CFRP winding layer is 68%; $i_p$ represents the density of an applied cathodic protection current, which usually ranges from 2 mA/m² to 20 mA/m² and is taken as 20 mA/m²; $\rho$ represents a reinforcement ratio of a tensile steel bar; $A_c$ represents cross-sectional area perpendicular to the CFRP-wrapped composite bar with the SMA embedded with the optical fiber in the smart CFRP-SMA bar reinforced concrete structure; and n represents a number of tensile steel bars.

Preferably, a calculation formula for the initial bearing capacity of the smart CFRP-SMA bar reinforced concrete structure is shown in formula II:

$$M_i = \left(d - \frac{A_s f_y + A_f E_f \varepsilon_{fi}}{1.7 f_c b}\right)(A_s f_y + a_f E_f \varepsilon_{fi}) \quad \text{Formula II}$$

where in formula II, assuming that the plain round Fe-SMA bar of the CFRP-wrapped composite bar with the SMA embedded with the optical fiber and the steel bar has same yield strength, namely $f_y$, $A_s$ represents the total area of the steel bar and the plain round Fe-SMA bar, d represents an effective height of the smart CFRP-SMA bar reinforced concrete structure, $A_f$ represents the cross-sectional area of the CFRP winding layer, $E_f$ represents an elastic modulus of the CFRP winding layer, $\varepsilon_{fi}$ represents the strain of the CFRP winding layer when the normal load is initially applied, $f_c'$ represents the strength of the concrete, b represents a width of the smart CFRP-SMA bar reinforced concrete structure, and $M_i$ represents the initial bearing capacity of the smart CFRP-SMA bar reinforced concrete structure.

Preferably, a calculation formula for the contribution $\Delta M$ generated by the pretightening force to the bearing capacity is shown in formula III:

$$\Delta M = (\delta_{pc} - \gamma f_{tk}) W_0 \quad \text{Formula III}$$

$$\gamma = ((0.7 - 120/h)\gamma_m \quad \text{Formula IV}$$

$$\sigma_{pc} E_{sp} \Delta \varepsilon_{sp} = E_{sp} \left(\Delta l \sum_{i=1}^{u} \varepsilon_{sp,i}\right) / l \quad \text{Formula V}$$

where in the formula III, $\Delta M$ represents the contribution generated by the pretightening force to the bearing capacity, $f_{tk}$ represents a standard value of tensile strength of the concrete, $W_0$ represents an elastic resistance moment of a tensile edge of a transformed cross-section, $\gamma_m$ represents a basic value of a plastic influence coefficient of a cross-section resistance moment of the smart CFRP-SMA bar reinforced concrete structure, which is taken as 1.15 for a rectangular cross-section, $\gamma$ represents the plastic influence coefficient of the cross-section resistance moment of the smart CFRP-SMA bar reinforced concrete structure, which is calculated according to the formula IV, $\sigma_{pc}$ represents pre-stress of the plain round Fe-SMA bar of the CFRP-wrapped composite bar with the SMA embedded with the optical fiber, which is calculated according to the formula V, $E_{sp}$ represents an elastic modulus of the CFRP-wrapped composite bar with the SMA embedded with the optical fiber, l represents spatial resolution of distributed optical fiber sensing acquisition, u represents a total quantity of measurement points for distributed optical fiber acquisition, i represents a measurement point for the distributed optical fiber acquisition, $\varepsilon_{sp,i}$ represents strain at an $i^{th}$ measurement point after the excitation current is applied, l represents a total length of a distributed optical fiber sensing measurement section, and $\Delta\varepsilon_{sp}$ represents the average strain of the CFRP-wrapped composite bar with the SMA embedded with the optical fiber after the excitation current is applied.

Preferably, a calculation formula for the strain $\varepsilon_{fa}$ of the CFRP winding layer when the excitation current is applied is shown in formula VI:

$$\varepsilon_{fa} = \left(-B + \sqrt{B^2 - 4AC}\right)/2A \quad \text{Formula VI}$$

where $A = -A_f^2 E_f^2$, $B = 2A_s f_y A_f E_f - 1.7 f_c' b d E_f$, and $$C = 1.7 f_c' f_y b d A_s - 1.7 f_c' b M_a - A_s^2 A_f^2.$$

The present disclosure provides a smart CFRP-SMA bar reinforced concrete structure, including an ICCP system and an ICCP system deterioration enhancement system. The ICCP system includes a reinforcing cage, concrete, a CFRP-wrapped composite reinforcement material with SMA embedded with an optical fiber, steel bars, and a first external power supply. The reinforcing cage is placed in the concrete. The CFRP-wrapped composite bar with the SMA embedded with the optical fiber and the steel bars are dispersed in the concrete. A CFRP winding layer of the CFRP-wrapped composite bar with the SMA embedded with the optical fiber is connected to a positive terminal of the first external power supply through a wire, and the steel bars are connected to a negative terminal of the first external power supply through wires. The ICCP system deterioration enhancement system includes a second external power supply. A positive terminal and a negative terminal of the second external power supply are respectively connected to two ends of a plain round Fe-SMA bar of the CFRP-wrapped composite bar with the SMA embedded with the optical fiber through wires. The first external power supply is configured to provide DC power for the ICCP system, and the second external power supply is an excitation device for the plain round Fe-SMA bar.

Different from a traditional ICCP concrete structure system, the CFRP-wrapped composite bar with the SMA embedded with the optical fiber, which integrates cathodic protection, force sensing, stress adjustment, and structural enhancement, is a multifunctional smart reinforcement material, which is both a concrete reinforced bar and an auxiliary anode for ICCP to prevent the steel bar from being rusted. In addition, the SMA has the ability to adjust stress after excitation, and the embedded optical fiber can perform self-sensing on a force condition of the reinforcement material. A method for calculating the strain of an outer-layer CFRP when it is determined to apply an excitation current is proposed, with residual strength efficiency of the outer-layer CFRP of the composite bar as a control index. In a new structure system in which the outer-layer CFRP serves as an auxiliary anode for an ICCP technology and a performance improvement method after deterioration, the stress adjustment ability of the reinforcement material after the excitation generates pre-pressure and an antiarch in the structure, thereby compensating for strength degradation caused by the outer-layer CFRP as the auxiliary anode. The self-sensing function can monitor a performance threshold when the compensation begins. In addition, the composite bar itself can serve as a structural load-bearing component with good corrosion resistance. This structure system effectively solves problems of durability and in-service real-time smart sensing and bearing capacity control of a concrete structure in a coastal environment and also solves a performance degradation problem caused by CFRP deterioration in a traditional ICCP process.

In the figures, 1: glass fiber inner core; 2: polyimide coating layer; 3: polyurethane wrapping layer; 4: notch groove; 5: plain round Fe-SMA bar; 6: sheathing optical cable; 7. corrugated casing; 8: CFRP winding layer; 9: tightening sheath.

DETAILED DESCRIPTION OF THE EMBODIMENTS

Figure 6:
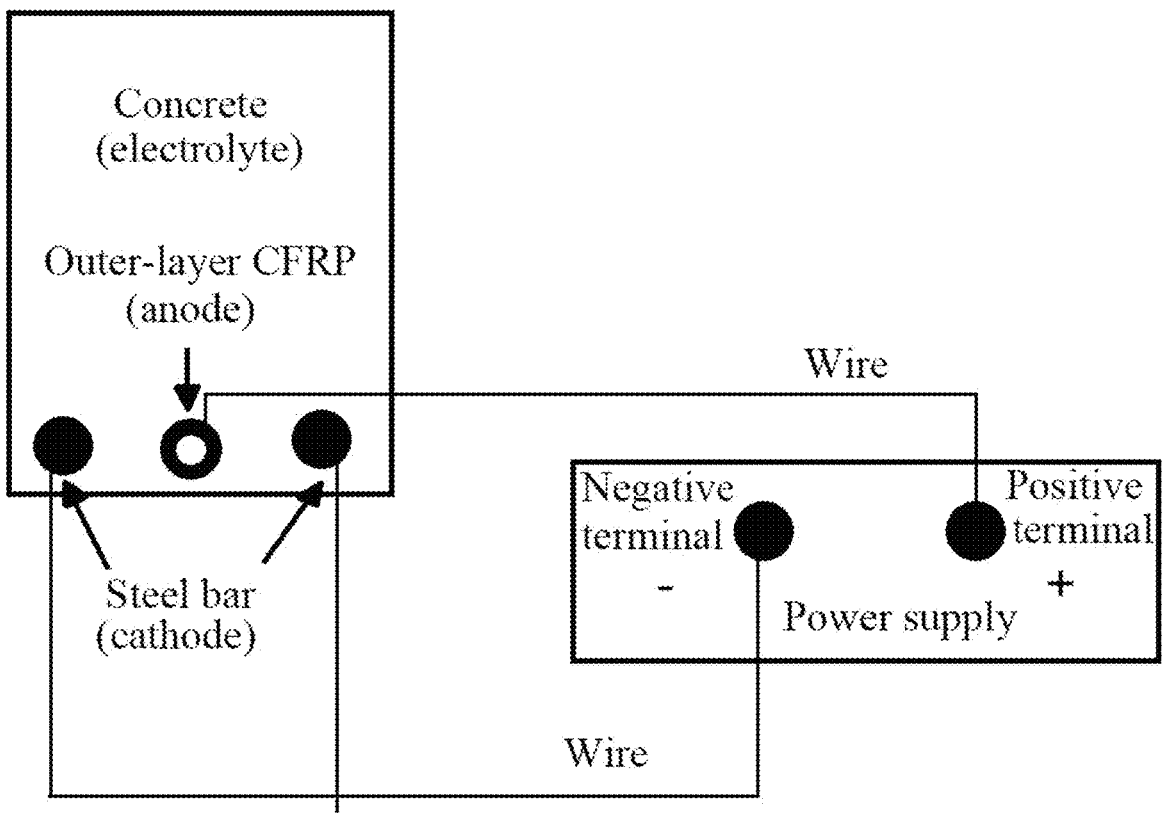
FIG. 6 is a schematic structural diagram of an ICCP system of a smart CFRP-SMA bar reinforced concrete structure in the present disclosure.
Figure 7:
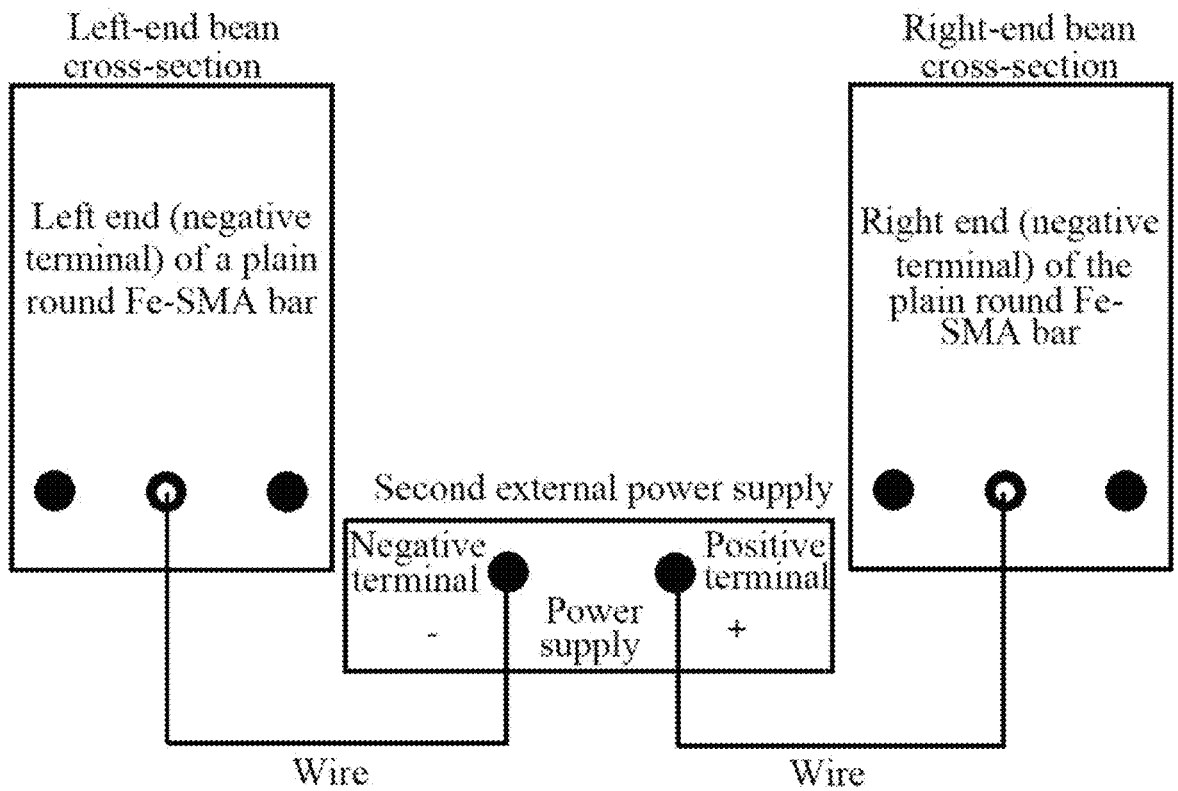
FIG. 7 is a schematic structural diagram of an ICCP system deterioration enhancement system of a smart CFRP-SMA bar reinforced concrete structure in the present disclosure.

As shown in FIG. 6 and FIG. 7, the present disclosure provides a smart CFRP-SMA bar reinforced concrete structure, including an ICCP system and an ICCP system deterioration enhancement system.

The ICCP system includes a reinforcing cage, concrete, a CFRP (carbon fiber reinforced polymer)-wrapped composite reinforcement material with SMA embedded with an optical fiber, steel bars, and a first external power supply. The reinforcing cage is placed in the concrete. The CFRP-wrapped composite bar with the SMA embedded with the optical fiber and the steel bars are dispersed in the concrete. A CFRP winding layer of the CFRP-wrapped composite bar with the SMA embedded with the optical fiber is connected to a positive terminal of the first external power supply through a wire, and the steel bars are connected to a negative terminal of the first external power supply through wires.

The ICCP system deterioration enhancement system includes a second external power supply.

A positive terminal and a negative terminal of the second external power supply are respectively connected to two ends of a plain round Fe-SMA bar of the CFRP-wrapped composite bar with the SMA embedded with the optical fiber through wires.

The first external power supply is configured to provide DC power for the ICCP system.

The second external power supply is an excitation device for the plain round Fe-SMA bar.

Unless otherwise specified, the present disclosure has no special requirements for sources of used raw materials, and commercially-available commodities well known to those skilled in the art can be adopted.

The smart CFRP-SMA bar reinforced concrete structure provided in the present disclosure includes the ICCP system.

In the present disclosure, the ICCP system includes the reinforcing cage, the concrete, the CFRP (carbon fiber reinforced polymer)-wrapped composite reinforcement material with the SMA embedded with the optical fiber, the steel bars, and the first external power supply. The reinforcing cage is placed in the concrete. The CFRP-wrapped composite bar with the SMA embedded with the optical fiber and the steel bars are dispersed in the concrete. The CFRP winding layer of the CFRP-wrapped composite bar with the SMA embedded with the optical fiber is connected to the positive terminal of the first external power supply through the wire, and the steel bars are connected to the negative terminal of the first external power supply through the wires.

In the present disclosure, there are preferably two steel bars. The steel bars are preferably placed on two sides of the CFRP-wrapped composite bar with the SMA embedded with the optical fiber. The reinforcing cage is preferably made of a ribbed bar. In the present disclosure, a quantity of steel bars is not particularly limited and can be determined based on actual needs.

In the present disclosure, the wire is preferably a metal wire. In the present disclosure, a type and a size of the metal wire are not particularly limited and can be selected based on actual needs.

In the present disclosure, the first external power supply is configured to provide the DC power for the ICCP system. A voltage of the first external power supply preferably ranges from 5 V to 20 V, and more preferably ranges from 10 V to 20 V. A current of the first external power supply preferably ranges from 200 mA to 3 A, and more preferably ranges from 1 A to 3 A.

The smart CFRP-SMA bar reinforced concrete structure provided in the present disclosure includes the ICCP system deterioration enhancement system.

In the present disclosure, the ICCP system deterioration enhancement system includes the second external power supply. The positive terminal and the negative terminal of the second external power supply are respectively connected to the two ends of the plain round Fe-SMA bar of the CFRP-wrapped composite bar with the SMA embedded with the optical fiber through the wires.

In the present disclosure, the wire is preferably a metal wire. In the present disclosure, a type and a size of the metal wire are not particularly limited and can be selected based on actual needs.

In the present disclosure, the second external power supply is the excitation device for the plain round Fe-SMA bar. A voltage of the second external power supply preferably ranges from 5 V to 20 V, and more preferably ranges from 10 V to 20 V. A current of the second external power supply preferably ranges from 200 mA to 3 A, and more preferably ranges from 1 A to 3 A.

In the present disclosure, a size of the smart CFRP-SMA bar reinforced concrete structure and a diameter and a length of the steel bar are not particularly limited, and can be determined based on actual needs.

The CFRP-wrapped composite bar with the SMA embedded with the optical fiber that integrates force sensing, stress driving, and structural enhancement in the present disclosure uses Fe-SMA with an embedded optical fiber sensor and a surface notch groove as an inner core, and has characteristics of self-resetting to apply prestress, prestress loss self-sensing, and the structural enhancement. This smart CFRP-SMA bar reinforced concrete structure can effectively solve problems of durability, in-service real-time smart sensing and bearing capacity regulation and control of a structure system in a coastal environment, and also solves a performance degradation problem caused by CFRP deterioration in a traditional ICCP process.

As shown in FIG. 1 to FIG. 5, in the present disclosure, the CFRP-wrapped composite bar with the SMA embedded with the optical fiber preferably includes: a sheathing optical cable 6, a plain round Fe-SMA bar 5, a CFRP winding layer 8, a tightening sheath 9, and a metal wire. The sheathing optical cable 6 includes a glass fiber inner core 1, a polyimide coating layer 2, and a polyurethane wrapping layer 3 that are stacked sequentially from inside to outside. The plain round Fe-SMA bar 5 is provided with a notch groove 4 along a length direction. The sheathing optical cable 6 is embedded in the notch groove 4 in parallel. The CFRP winding layer 8 is wound around an outer surface of the plain round Fe-SMA bar 5, and the CFRP winding layer 8 is made of the carbon fiber reinforced polymer and is more preferably made of an epoxy resin composite fiber. The tightening sheath 9 includes a first tightening sheath and a second tightening sheath, which are respectively sleeved at joints between two ends of the sheathing optical cable 6 and the CFRP winding layer 8. An outer surface of the CFRP winding layer 8 is provided with a ribbed structure. Two wires are respectively led out from two ends of the plain round Fe-SMA bar 5.

The CFRP-wrapped composite bar with the SMA embedded with the optical fiber provided in the present disclosure preferably includes the sheathing optical cable 6. In the present disclosure, the sheathing optical cable 6 includes the glass fiber inner core 1, the polyimide coating layer 2, and the polyurethane wrapping layer 3 which are stacked sequentially from inside to outside. The diameter of the sheathing optical cable 6 is preferably less than 1 mm and more preferably less than 0.9 mm. A type of sheathing optical cable is not particularly limited in the present disclosure, and a sheathing optical cable well-known in the art can be used. The diameter of the sheathing optical cable within this range can avoid affecting the mechanical property of the reinforcement material after the sheathing optical cable is implanted.

Figure 1:
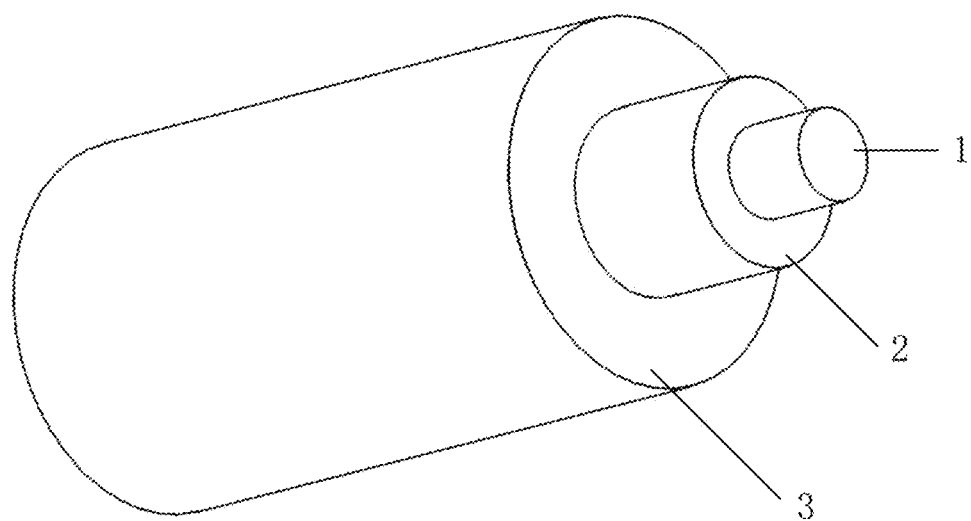
FIG. 1 is a schematic structural diagram of a sheathing optical cable in the present disclosure.

In the present disclosure, a structure of the sheathing optical cable 6 is shown in FIG. 1. It can be seen from FIG.

1 that the center of the sheathing optical cable 6 is the glass fiber inner core 1, an outer layer of the glass fiber inner core 1 is wrapped with the polyimide coating layer 2, and an outer layer of the polyimide coating layer 2 is wrapped with the polyurethane wrapping layer 3.

The CFRP-wrapped composite bar with the SMA embedded with the optical fiber provided in the present disclosure preferably includes the plain round Fe-SMA bar 5. In the present disclosure, the plain round Fe-SMA bar is a commercially-available commodity. In the present disclosure, a diameter and strength of the plain round Fe-SMA bar are not particularly limited and can be selected and produced based on actual project needs. The diameter of the plain round Fe-SMA bar is preferably 8 mm, 10 mm, or 14 mm.

In the present disclosure, the plain round Fe-SMA bar 5 is provided with the notch groove 4 along the length direction. The notch groove 4 is preferably a square groove of 1 mm×1 mm. There is preferably one or more notch grooves 4 and more preferably one notch groove 4. The sheathing optical cable 6 is embedded in the notch groove 4 in parallel, and there is preferably one or more sheathing optical cables and more preferably one sheathing optical cable. In the present disclosure, positions and a quantity of notch grooves on the plain round Fe-SMA bar and a quantity of implanted sheathing optical cables can be selected based on actual needs.

In the present disclosure, a size of the notch groove 4 is preferably greater than that of the sheathing optical cable 6.

Figure 2:
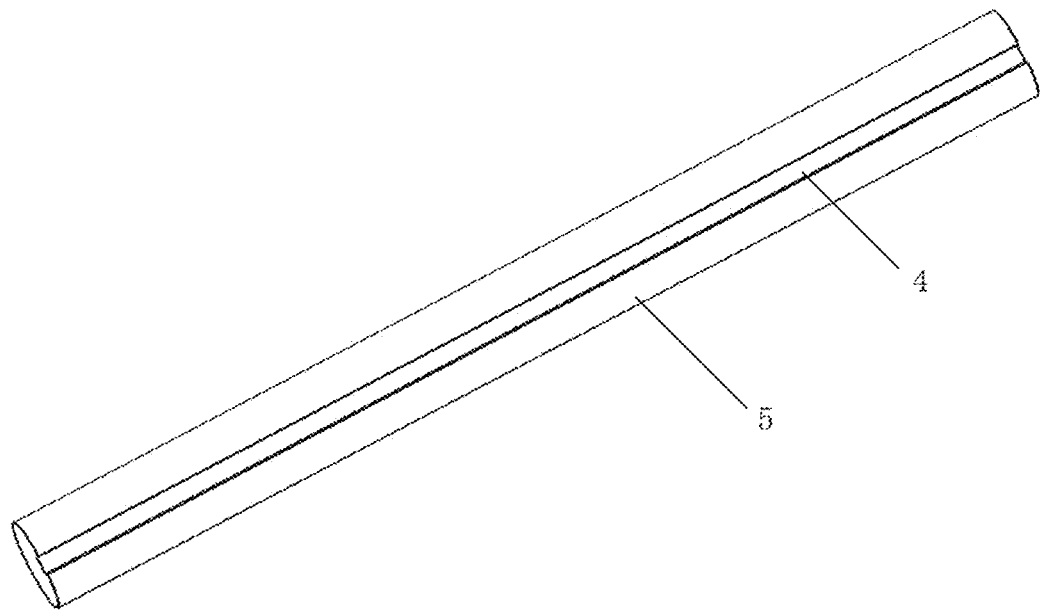
FIG. 2 is a schematic diagram of a plain round Fe-SMA bar with a notch groove in the present disclosure.

In the present disclosure, a structure of the plain round Fe-SMA bar 5 is shown in FIG. 2. As shown in FIG. 2, the notch groove 4 is provided along the length direction of the plain round Fe-SMA bar 5.

In the present disclosure, a length of the sheathing optical cable 6 is preferably greater than that of the plain round Fe-SMA bar 5, the sheathing optical cable 6 extends out of the two ends of the plain round Fe-SMA bar 5, and two parts that are of the sheathing optical cable 6 and respectively extend out of the two ends of the plain round Fe-SMA bar 5 each are sleeved with a corrugated casing 7.

Figure 3:
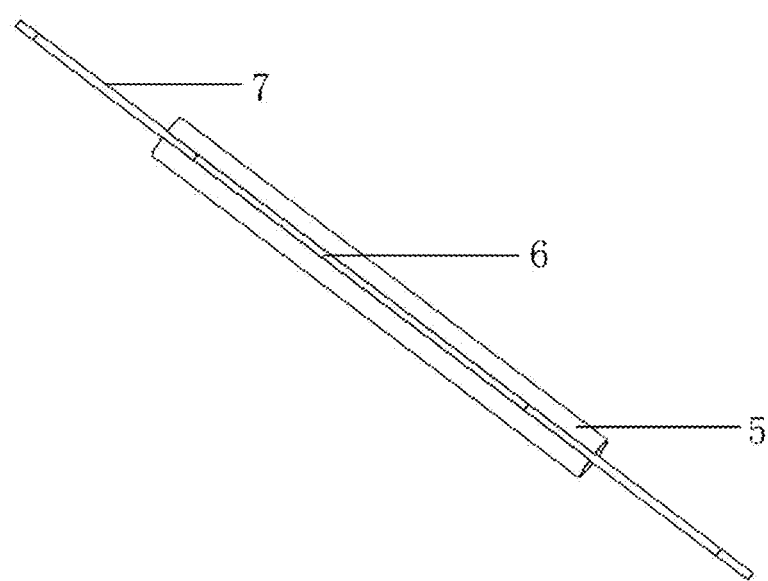
FIG. 3 is a schematic diagram in which two parts of a sheathing optical cable extending out of two ends of a plain round Fe-SMA bar each are sleeved with a corrugated casing in the present disclosure.

The two parts that are of the sheathing optical cable and respectively extend out of the two ends of the plain round Fe-SMA bar each are sleeved with the corrugated casing in the present disclosure is shown in FIG. 3. It can be seen from FIG. 3 that the corrugated casing is sleeved on each of the two parts that are of the sheathing optical cable and respectively extend out of the two ends of the plain round Fe-SMA bar, and enters a part of the notch groove.

The CFRP-wrapped composite bar with the SMA embedded with the optical fiber provided in the present disclosure preferably includes the CFRP winding layer 8. In the present disclosure, the CFRP winding layer 8 is wound around the outer surface of the plain round Fe-SMA bar 5, and the CFRP winding layer 8 is made of the carbon fiber reinforced polymer. The CFRP winding layer has a thickness of preferably 1 mm to 3 mm and more preferably 2 mm. In the art, the thickness of the CFRP winding layer can be determined based on an actual situation.

Figure 4:
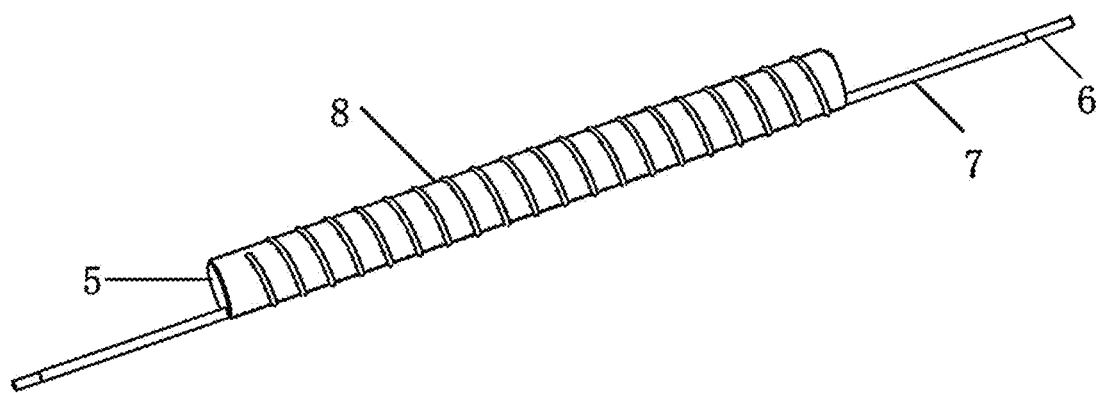
FIG. 4 is a schematic diagram of a plain round Fe-SMA bar with a CFRP winding layer in the present disclosure.

A structure of the plain round Fe-SMA bar with the CFRP winding layer in the present disclosure is shown in FIG. 4. It can be seen from FIG. 4 that the epoxy resin composite fiber is wound around an outer layer of the plain round Fe-SMA bar to form the CFRP winding layer.

The CFRP-wrapped composite bar with the SMA embedded with the optical fiber provided in the present disclosure preferably includes the tightening sheath 9. In the present disclosure, the tightening sheath 9 includes the first tightening sheath and the second tightening sheath, which are respectively sleeved at the joints between the two ends of the sheathing optical cable 6 and the CFRP winding layer 8. In the present disclosure, the tightening sheath 9 is preferably sleeved on an end portion of the CFRP winding layer 8 by 20 mm, and the tightening sheath 9 is preferably at least 50 mm shorter than the sheathing optical cable 6.

Figure 5:
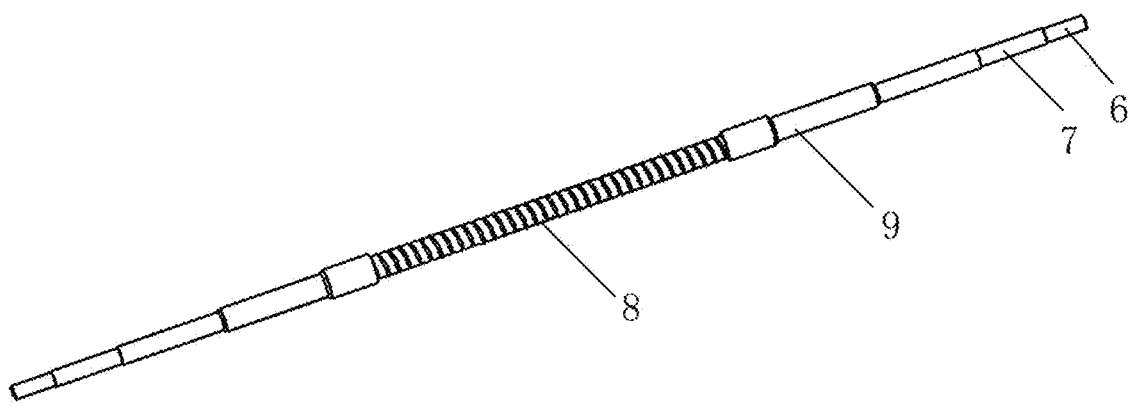
FIG. 5 is a schematic diagram of a CFRP-wrapped composite bar with SMA embedded with an optical fiber in the present disclosure.

A structure of the CFRP-wrapped composite bar with the SMA embedded with the optical fiber in the present disclosure is shown in FIG. 5. It can be seen from FIG. 5 that the tightening sheath is sleeved on a part of the winding layer from the two ends of the sheathing optical cable.

In the present disclosure, the outer surface of the CFRP winding layer 8 is provided with the ribbed structure. The ribbed structure is preferably formed by winding a fiber bundle. In the present disclosure, a width of the ribbed structure is preferably 5 mm, a height of the ribbed structure is preferably 2 mm, and a spacing between the ribbed structure is preferably 5 mm. In the present disclosure, a ribbed structure is provided on a surface of the CFRP-wrapped composite bar with the SMA embedded with the optical fiber and has a sufficient anchoring effect, which can ensure the efficiency of anchoring between the reinforcement material and the concrete in a self-driven tensioning process and reduce a prestress loss.

Preferably, the present disclosure further includes: adding an anchoring part at an end portion of the CFRP-wrapped composite bar with the SMA embedded with the optical fiber to replace the ribbed structure, where the anchoring part is preferably a steel-sleeve anchoring part.

Preferably, the present disclosure further includes: reserving a 50 mm portion unwrapped with the CFRP winding layer 8 in the middle of the plain round Fe-SMA bar 5, and covering a high-resistance coating 10 on the portion unwrapped with the CFRP winding layer 8 to replace the CFRP winding layer 8. A thickness of the high-resistance coating 10 is preferably 15 μm. The high-resistance coating 10 is preferably made of graphene-carbon nanotube composite water-based conductive material. A model of the graphene-carbon nanotube composite water-based conductive material is TF-H-001, and a manufacturer is Suzhou Carbon Feng Graphene Technology Co., Ltd. A coating process is not particularly limited in the present disclosure, and a coating process well-known in the art can be used.

The high-resistance coating is used to enable the Fe-SMA bar in a high-resistance region to generate a higher excitation temperature in advance when an excitation current is applied, and serves as a self-driven section for recovering and adjusting a designed elongation. A region wrapped with the CFRP winding layer 8, whose temperature is lower than a maximum glass transition temperature, serves as an anchoring section.

In the present disclosure, a preparation method for the CFRP-wrapped composite bar with the SMA embedded with the optical fiber includes preferably the following steps:
  notching the plain round Fe-SMA bar 5 along the length direction to form the notch groove 4;
  fixing the sheathing optical cable 6 in the notch groove 4 in parallel, winding the plain round Fe-SMA bar 5 with the epoxy resin composite fiber, and performing curing to obtain a plain round Fe-SMA bar 5 wrapped with the CFRP winding layer 8; and
  sleeving the tightening sheath 9 into two ends of the CFRP winding layer 8 from the sheathing optical cable 6, and finally disposing of the ribbed structure on the outer surface of the CFRP winding layer 8 to obtain the CFRP-wrapped composite bar with the SMA embedded with the optical fiber.

The sheathing optical cable 6 extends out of the two ends of the plain round Fe-SMA bar 5.

In the present disclosure, preferably, the plain round Fe-SMA bar 5 is notched along the length direction to form the notch groove 4.

Before the notching, preferably, the present disclosure further includes: pre-tensioning the plain round Fe-SMA bar 5 based on the designed pre-tensioning strain, where an elongation of the pre-tensioned plain round Fe-SMA bar 5 is preferably 2% to 6% and more preferably 3% to 5%.

In the present disclosure, a metal notching machine is preferably used for the notching. In the present disclosure, a notching process is not particularly limited in the present disclosure, and a notching process well known to those skilled in the art can be used.

After the notching, the present disclosure preferably coats insulating paint on an outer surface of an inner core of the notched plain round Fe-SMA bar 5. A thickness of the insulating paint is preferably 0.3 mm.

In the present disclosure, after the notch groove 4 is obtained, the sheathing optical cable 6 is preferably fixed in the notch groove 4 in parallel.

In the present disclosure, the sheathing optical cable 6 extends out of the two ends of the plain round Fe-SMA bar 5.

Before the sheathing optical cable 6 is fixed in the notch groove 4 in parallel, the present disclosure preferably pre-processes a surface of the plain round Fe-SMA bar 5. The preprocessing preferably includes sequential polishing, cleaning, and drying. The polishing is preferably performed using sandpaper. The cleaning is preferably performed using acetone. A temperature of the drying is preferably 30° C. to 40° C., and more preferably 35° C. The time of the drying is preferably 3 hours to 5 hours, and more preferably 5 hours. The present disclosure removes rust stains from the surface of the plain round Fe-SMA bar through the preprocessing.

In the present disclosure, a method for the fixation is preferably to first use an adhesive tape to stick and fix the sheathing optical cable 6, and then use glue to seal the notch groove 4. In the present disclosure, the adhesive tape is preferably a scotch tape. The glue is not particularly limited in the present disclosure, and glue well-known in the art can be used. In the present disclosure, the fixation specifically includes: burying the sheathing optical cable 6 at a bottom of the notch groove 4 of the plain round Fe-SMA bar 5, keeping the sheathing optical cable 6 in a tightened state, and fixing the sheathing optical cable 6 with the scotch tape to ensure a position of the sheathing optical cable 6; and then placing the glue in the notch groove 4 to avoid relative slippage between the sheathing optical cable 6 and the plain round Fe-SMA bar 5.

After the fixation, the present disclosure preferably leads out a wire at each end of the plain round Fe-SMA bar 5 to apply the excitation current during later use.

The present disclosure preferably reserves an unsealed section in the notch groove 4 at the two ends of the plain round Fe-SMA bar 5. After the glue solidifies, the corrugated casing 7 is sleeved into the two ends of the sheathing optical cable 6 and placed in the notch groove 4 of the unsealed section. In the present disclosure, the unsealed section is preferably 10 mm long.

In the present disclosure, a diameter of the corrugated casing 7 is preferably 1 mm. A Length of the corrugated casing 7 is preferably at least 20 mm shorter than that of the sheathing optical cable 6.

Preferably, the present disclosure further includes: sleeving the corrugated casing 7 into the two ends of the sheathing optical cable 6 extending from the two ends of the plain round Fe-SMA bar 5 and placing the corrugated casing 7 in an end portion of the notch groove 4 of the unsealed section.

In the present disclosure, the two ends of the sheathing optical cable are preferably sleeved with the corrugated casing to prevent the sheathing optical cable from being damaged with a large angle at an end portion of the notched plain round Fe-SMA bar. In addition, the corrugated casing 7 is also a conductive material and can be used to connect a wire for the excitation current.

In the present disclosure, after the sheathing optical cable 6 is fixed in the notch groove 4 in parallel, the carbon fiber reinforced polymer is preferably selected to wind the plain round Fe-SMA bar 5, and the curing is performed to obtain the plain round Fe-SMA bar 5 wrapped with the CFRP winding layer 8.

In the present disclosure, the epoxy resin composite fiber preferably includes an epoxy resin-impregnated fiber cloth and an epoxy resin-impregnated fiber bundle. The fiber cloth is preferably a carbon fiber cloth, a glass fiber cloth, or a basalt fiber cloth, and is more preferably the carbon fiber cloth. The fiber bundle is preferably a carbon fiber, a basalt fiber, a glass fiber, an aramid fiber, or a plant fiber, and is more preferably the carbon fiber.

Types and amounts of the epoxy resin, the fiber cloth, and the fiber bundle are not particularly limited in the present disclosure and can be determined based on actual needs.

In the present disclosure, when the carbon fiber reinforced polymer is the epoxy resin composite fiber, a winding process is preferably to use the epoxy resin-impregnated fiber cloth to wrap the plain round Fe-SMA bar 5 into which the sheathing optical cable 6 is implanted, and then perform hoop winding with the epoxy resin-impregnated fiber bundle to form the CFRP winding layer 8. The hoop winding is preferably carried out along the length direction of the plain round Fe-SMA bar 5, and is more preferably carried out at 90 degrees along the length direction of the plain round Fe-SMA bar 5. A direction of a carbon fiber in the carbon fiber cloth is consistent with that of the plain round Fe-SMA bar. A thickness of the epoxy resin-impregnated fiber bundle is not particularly limited in the present disclosure, and can be determined based on an actual requirement, for example, may be 1 mm or 2 mm.

In an embodiment of the present disclosure, the winding process is specifically as follows: brushing epoxy resin on the fiber cloth, wrapping the fiber cloth around the outer surface of the plain round Fe-SMA bar 5 after the epoxy resin is fully impregnated, and after the curing, performing the hoop winding on the epoxy resin-impregnated fiber bundle along the length direction of the plain round Fe-SMA bar 5 to form the CFRP winding layer 8.

In the present disclosure, after the plain round Fe-SMA bar 5 wrapped with the CFRP winding layer 8 is obtained, the tightening sheath 9 is sleeved into the two ends of the CFRP winding layer 8 from the sheathing optical cable 6.

In the present disclosure, a length of the tightening sheath 9 that is sleeved into the end portion of the plain round Fe-SMA bar 5 wrapped with the CFRP winding layer 8 is preferably at least 20 mm. A diameter of the tightening sheath 9 is preferably 1 mm longer than that of the steel bar 5 wrapped with the CFRP winding layer 8. The sheathing optical cable 6 is preferably at least 50 mm longer than the tightening sheath 9. The corrugated casing 7 is preferably at least 30 mm longer than the tightening sheath 9.

In the present disclosure, the sheathing optical cable is allowed to extend out of two ends of the tightening sheath to facilitate subsequent fusion jointing of the sheathing optical cable with an optical fiber jumper.

The present disclosure preferably further includes: heating the tightening sheath 9. The heating is preferably performed using a heat gun. In the present disclosure, the tightening sheath is heated to allow contraction, such that the tightening sheath tightly wraps the winding layer.

In the present disclosure, after the tightening sheath 9 is sleeved from the sheathing optical cable 6, the ribbed structure is disposed on the outer surface of the CFRP winding layer 8 to obtain the CFRP-wrapped composite bar with the SMA embedded with the optical fiber.

In the present disclosure, the disposing of the ribbed structure is preferably to wind the outer surface of the CFRP winding layer 8 with the fiber bundle to form the ribbed structure. For the ribbed structure, the width is preferably 5 mm, a height is preferably 2 mm, and a rib spacing is preferably 5 mm. The present disclosure provides the ribbed structure to ensure the efficiency of the anchoring between the reinforcement material and the concrete in the tensioning process and reduce the prestress loss.

The present disclosure pre-implants the sheathing optical cable into the notch groove on the surface of the plain round Fe-SMA bar. In this way, the plain round Fe-SMA bar has a self-sensing function, that is, is "smart", to control the prestress in the tensioning process and monitor the prestress loss during normal use. The obtained CFRP-wrapped composite bar with the SMA embedded with the optical fiber is different from a traditional steel-continuous-fiber smart bar. A steel inner core used in the present disclosure is the plain round Fe-SMA bar, which has a shape memory effect. That is, the plain round Fe-SMA bar cannot recover on its own after pre-stretching at room temperature, but can recover to its original state after being excited by a specific heating temperature. Owing to this characteristic, the CFRP-wrapped composite bar with the SMA embedded with the optical fiber can be self-driven. Wrapping the fiber on the surface of the notched plain round Fe-SMA bar into which the sheathing optical cable is implanted can form the CFRP winding layer to prevent the inner core of the plain round Fe-SMA bar from being rusted and prevent the sheathing optical cable from being broken, thereby improving the durability of a prestressed bar. The ribbed structure on the surface of the CFRP winding layer can provide sufficient biting force and a sufficient anchoring effect, to ensure that the prestress is distributed uniformly in a prestress application process and reduce a prestress loss due to friction and other factors. Therefore, the CFRP-wrapped composite bar with the SMA embedded with the optical fiber proposed in the present disclosure has characteristics of self-driving, self-sensing, and a low prestress loss, overcoming shortcomings of the existing steel-continuous-fiber composite bar, such as a large prestress loss, low anchoring efficiency, low tension prestress control accuracy, and complex construction. As a load-bearing material, the CFRP-wrapped composite bar with the SMA embedded with the optical fiber can be applied to prestress application and prestress loss monitoring of various complex engineering components. Moreover, the CFRP-wrapped composite bar with the SMA embedded with the optical fiber provided in the present disclosure is corrosion-resistant, has high strength and precision, is easy to construct, and can be applied in engineering, making it suitable for large-scale promotion.

The present disclosure further provides a preparation method for the smart CFRP-SMA bar reinforced concrete structure in the above technical solutions, including the following steps:

placing a reinforcing cage with a built-in CFRP-wrapped composite bar with SMA embedded with an optical fiber and built-in steel bars in a mold, pouring concrete, and performing curing;

connecting a CFRP winding layer of the CFRP-wrapped composite bar with the SMA embedded with the optical fiber to a positive terminal of a first external power supply through a wire, and connecting the steel bars to a negative terminal of the first external power supply through wires; and respectively connecting two ends of a plain round Fe-SMA bar of the CFRP-wrapped composite bar with the SMA embedded with the optical fiber to a positive terminal and a negative terminal of a second external power supply through wires.

The concrete and the mold are not particularly limited in the present disclosure, and can be selected based on actual needs.

A curing process is not particularly limited in the present disclosure, and a curing process well-known in the art can be used.

The present disclosure further provides an enhancement method for deterioration of an ICCP system, including the following steps:

applying an excitation current to a plain round Fe-SMA bar of a CFRP-wrapped composite bar with SMA embedded with an optical fiber in the smart CFRP-SMA bar reinforced concrete structure in the above technical solutions or in the smart CFRP-SMA bar reinforced concrete structure prepared by using the preparation method in the above technical solutions, such that the CFRP-wrapped composite bar with the SMA embedded with the optical fiber generates pretightening force, where the pretightening force makes a contribution $\Delta M$ to a bearing capacity of the smart CFRP-SMA bar reinforced concrete structure, thereby enhancing the deterioration of the ICCP system;

A method for applying the excitation current includes: applying the excitation current to the plain round Fe-SMA bar of the CFRP-wrapped composite bar with the SMA embedded with the optical fiber after a CFRP winding layer deteriorates when the ICCP system is turned on, or directly applying the excitation current to the plain round Fe-SMA bar of the CFRP-wrapped composite bar with the SMA embedded with the optical fiber when a CFRP winding layer does not deteriorate before the ICCP system is turned on;

When strain $\varepsilon_f$ of the CFRP winding layer after a normal service load is applied is greater than strain $\varepsilon_{fa}$ of the CFRP winding layer when the excitation current is applied, and power-on time T of the ICCP system is less than or equal to a service life $t_{life}$ of the smart CFRP-SMA bar reinforced concrete structure, when the ICCP system is turned on, the excitation current is applied to the plain round Fe-SMA bar of the CFRP-wrapped composite bar with the SMA embedded with the optical fiber after the CFRP winding layer deteriorates. The strain of the CFRP winding layer is continuously monitored when $\varepsilon_f \le \varepsilon_{fa}$, or the process is ended because a requirement for safe use is not met when $\varepsilon_f > \varepsilon_{fa}$ and $T > t_{life}$;

When the excitation current is directly applied to the plain round Fe-SMA bar of the CFRP-wrapped composite bar with the SMA embedded with the optical fiber when the CFRP winding layer does not deteriorate before the ICCP system is turned on, a bearing capacity $M_{i1}$ of the smart CFRP-SMA bar reinforced concrete structure after the pretightening force is applied in an initial design stage is calculated, where $M_{i1}$ is equal to a sum of the contribution $\Delta M$ generated by the pretightening force to the bearing capacity and an initial bearing capacity $M_i$ of the smart CFRP-SMA bar reinforced concrete structure. After the excitation current is applied, the ICCP system is turned on. When $M_{i1} \geq M_a$, the strain of the CFRP winding layer is continuously monitored. When $M_{i1} < M_a$, the strain of the CFRP winding layer is monitored, and if $\varepsilon_f > \varepsilon_{fa}$ and $T \leq t_{life}$, the excitation current is continuously applied to the plain round Fe-SMA bar of the CFRP-wrapped composite bar with the SMA embedded with the optical fiber;

A value of the excitation current satisfies: average strain $\Delta \varepsilon_{sp}$ of the CFRP-wrapped composite bar with the SMA embedded with the optical fiber after the excitation current is applied is greater than or equal to a difference between the strain $\varepsilon_{fa}$ of the CFRP winding layer when the excitation current is applied and strain $\varepsilon_{fi}$ of the CFRP winding layer when the normal load is initially applied, and the contribution $\Delta M$ generated by the pretightening force to the bearing capacity is greater than or equal to a difference between the initial bearing capacity $M_i$ of the smart CFRP-SMA bar reinforced concrete structure and the designed bearing capacity $M_a$ of the smart CFRP-SMA bar reinforced concrete structure for normal use.

The present disclosure applies the excitation current to the plain round Fe-SMA bar of the CFRP-wrapped composite bar with the SMA embedded with the optical fiber in the smart CFRP-SMA bar reinforced concrete structure in the above technical solutions or in the smart CFRP-SMA bar reinforced concrete structure prepared by using the preparation method in the above technical solutions, such that the CFRP-wrapped composite bar with the SMA embedded with the optical fiber generates the pretightening force. The pretightening force makes the contribution $\Delta M$ to the bearing capacity of the smart CFRP-SMA bar reinforced concrete structure, thereby enhancing the deterioration of the ICCP system.

In the present disclosure, the method for applying the excitation current includes: applying the excitation current to the plain round Fe-SMA bar of the CFRP-wrapped composite bar with the SMA embedded with the optical fiber after the CFRP winding layer deteriorates when the ICCP system is turned on, or directly applying the excitation current to the plain round Fe-SMA bar of the CFRP-wrapped composite bar with the SMA embedded with the optical fiber when the CFRP winding layer does not deteriorate before the ICCP system is turned on. Preferably, the excitation current is applied to the plain round Fe-SMA bar of the CFRP-wrapped composite bar with the SMA embedded with the optical fiber after the CFRP winding layer deteriorates when the ICCP system is turned on.

In the present disclosure, when the strain $\varepsilon_f$ of the CFRP winding layer after the normal service load is applied is greater than the strain $\varepsilon_{fa}$ of the CFRP winding layer when the excitation current is applied, and the power-on time T of the ICCP system is less than or equal to the service life $t_{life}$ of the smart CFRP-SMA bar reinforced concrete structure, when the ICCP system is turned on, the excitation current is applied to the plain round Fe-SMA bar of the CFRP-wrapped composite bar with the SMA embedded with the optical fiber after the CFRP winding layer deteriorates. The strain of the CFRP winding layer is continuously monitored when $\varepsilon_f \leq \varepsilon_{fa}$, or the process is ended because the requirement for safe use is not met when $\varepsilon_f > \varepsilon_{fa}$ and $T > t_{life}$.

In the present disclosure, when the excitation current is directly applied to the plain round Fe-SMA bar of the CFRP-wrapped composite bar with the SMA embedded with the optical fiber when the CFRP winding layer does not deteriorate before the ICCP system is turned on, the bearing capacity $M_{i1}$ of the smart CFRP-SMA bar reinforced concrete structure after the pretightening force is applied in the initial design stage is calculated, where $M_{i1}$=the sum of the contribution $\Delta M$ generated by the pretightening force to the bearing capacity and the initial bearing capacity $M_i$ of the smart CFRP-SMA bar reinforced concrete structure. After the excitation current is applied, the ICCP system is turned on. When $M_{i1} \geq M_a$, the strain of the CFRP winding layer is continuously monitored. When $M_{i1} < M_a$, the strain of the CFRP winding layer is monitored, and if $\varepsilon_f > \varepsilon_{fa}$ and $T \leq t_{life}$, the excitation current is continuously applied to the plain round Fe-SMA bar of the CFRP-wrapped composite bar with the SMA embedded with the optical fiber.

In the present disclosure, the value of the excitation current satisfies: the average strain $\Delta \varepsilon_{sp}$ of the CFRP-wrapped composite bar with the SMA embedded with the optical fiber after the excitation current is applied is greater than or equal to the difference between the strain $\varepsilon_{fa}$ of the CFRP winding layer when the excitation current is applied and the strain $\varepsilon_{fi}$ of the CFRP winding layer when the normal load is initially applied, and the contribution $\Delta M$ generated by the pretightening force to the bearing capacity is greater than or equal to the difference between the initial bearing capacity $M_i$ of the smart CFRP-SMA bar reinforced concrete structure and the designed bearing capacity $M_a$ of the smart CFRP-SMA bar reinforced concrete structure for the normal use.

Figure 10:
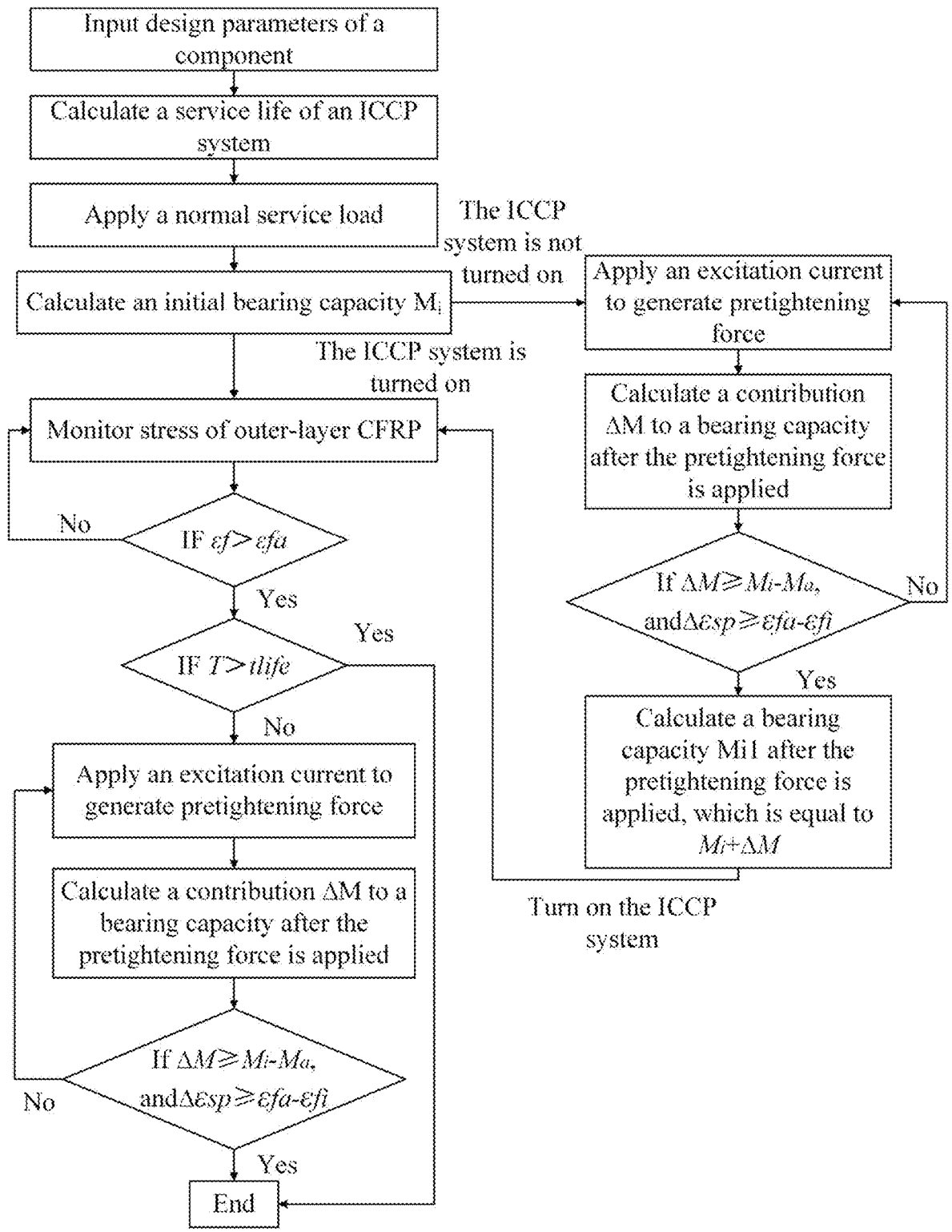
FIG. 10 is a flowchart of an enhancement method for deterioration of an ICCP system in the present disclosure.

As shown in FIG. 10, in the present disclosure, a process of the enhancement method preferably includes:

obtaining a service life of the ICCP system in the smart CFRP-SMA bar reinforced concrete structure in the above technical solutions or in the smart CFRP-SMA bar reinforced concrete structure prepared by using the preparation method in the above technical solutions;

applying the normal service load on the smart CFRP-SMA bar reinforced concrete structure;

obtaining the initial bearing capacity of the smart CFRP-SMA bar reinforced concrete structure;

turning on the ICCP system;

monitoring the strain of the CFRP winding layer of the CFRP-wrapped composite bar with the SMA embedded with the optical fiber in the smart CFRP-SMA bar reinforced concrete structure; when the strain $\varepsilon_f$ of the CFRP winding layer after the normal service load is applied is greater than the strain $\varepsilon_{fa}$ of the CFRP winding layer when the excitation current is applied, and the power-on time T of the ICCP system is less than or equal to the service life $t_{life}$ of the smart CFRP-SMA bar reinforced concrete structure, applying the excitation current; when the CFRP-wrapped composite bar with the SMA embedded with the optical fiber generates the pretightening force, calculating the contribution $\Delta M$ generated by the pretightening force to the bearing capacity, where when the average strain $\Delta \varepsilon_{sp}$ of the CFRP-wrapped composite bar with the SMA embedded with the optical fiber after the excitation current is applied is greater than or equal to the difference between the strain $\varepsilon_{fa}$ of the CFRP winding layer when the excitation current is applied and the strain $\varepsilon_{fi}$ of the CFRP winding layer when the normal load is initially applied, and the contribution $\Delta M$ generated by the pretightening force to the bearing capacity is greater than or equal to the difference between the initial bearing capacity $M_i$ of the smart CFRP-SMA bar reinforced concrete structure and the designed bearing capacity $M_a$ of the smart CFRP-SMA bar reinforced concrete structure for the normal use, the bearing capacity of the smart CFRP-SMA bar reinforced concrete structure after the deterioration meets a bearing capacity design requirement of the smart CFRP-SMA bar reinforced concrete structure; and when $\Delta \varepsilon_{sp} < \varepsilon_{fa} - \varepsilon_{fi}$ or $\Delta M < M_i - M_a$, continuously applying the excitation current until $\Delta \varepsilon_{sp} \geq \varepsilon_{fa} - \varepsilon_{fi}$ and $\Delta M \geq M_i - M_a$; and when $\varepsilon_f \leq \varepsilon_{fa}$, continuously monitoring the strain of the CFRP winding layer of the CFRP-wrapped composite bar with the SMA embedded with the optical fiber; or when $\varepsilon_f > \varepsilon_{fa}$ and $T > t_{life}$, ending the process because the requirement for safe use is not met;

Alternatively, before the ICCP system is turned on, after the normal service load is applied to the smart CFRP-SMA bar reinforced concrete structure, the excitation current is directly applied to the plain round Fe-SMA bar of the undeteriorated the CFRP-wrapped composite bar with the SMA embedded with the optical fiber. When the CFRP-wrapped composite bar with the SMA embedded with the optical fiber generates the pretightening force, the contribution $\Delta M$ generated by the pretightening force to the bearing capacity is calculated. When the average strain $\Delta \varepsilon_{sp}$ of the CFRP-wrapped composite bar with the SMA embedded with the optical fiber after the excitation current is applied is greater than or equal to the difference between the strain $\varepsilon_{fa}$ of the CFRP winding layer when the excitation current is applied and the $\varepsilon_{fi}$ of the CFRP winding layer when the normal load is initially applied, and the contribution $\Delta M$ generated by the pretightening force to the bearing capacity is greater than or equal to the difference between the initial bearing capacity $M_i$ of the smart CFRP-SMA bar reinforced concrete structure and the designed bearing capacity $M_a$ of the smart CFRP-SMA bar reinforced concrete structure for the normal use, the bearing capacity of the smart CFRP-SMA bar reinforced concrete structure after the deterioration meets the bearing capacity design requirement of the smart CFRP-SMA bar reinforced concrete structure. When $\Delta \varepsilon_{sp} < \varepsilon_{fa} - \varepsilon$ or $\Delta M < M_i - M_a$, the excitation current is continuously applied until $\Delta \varepsilon_{sp} \geq \varepsilon_{fa} - \varepsilon_{fi}$ and $\Delta M \geq M_i - M_a$;

The bearing capacity $M_{i1}$ of the smart CFRP-SMA bar reinforced concrete structure after the pretightening force is applied in the initial design stage is calculated, where $M_{i1}$=the sum of the contribution $\Delta M$ generated by the pretightening force to the bearing capacity and the initial bearing capacity $M_i$ of the smart CFRP-SMA bar reinforced concrete structure. When $M_{i1} \geq M_a$, the strain of the CFRP winding layer is continuously monitored. When $M_{i1} < M_a$, the strain of the CFRP winding layer is monitored, and if $\varepsilon_f > \varepsilon_{fa}$ and $T \leq t_{life}$, the excitation current is continuously applied to the plain round Fe-SMA bar of the CFRP-wrapped composite bar with the SMA embedded with the optical fiber, until $\Delta \varepsilon_{sp} \geq \varepsilon_{fa} - \varepsilon_{fi}$ and $\Delta M \geq M_i - M_a$.

In the present disclosure, a calculation formula for the service life of the smart CFRP-SMA bar reinforced concrete structure is preferably obtained according to a formula I:

$$t_{life} = A_a q_{anode} / \left( i_p \sqrt{4\pi n A_c \rho} \right) \qquad \text{Formula I}$$

In the formula I, $t_{life}$ represents the service life of the smart CFRP-SMA bar reinforced concrete structure; $A_a$ represents surface area per unit length of the CFRP winding layer of the CFRP-wrapped composite bar with the SMA embedded with the optical fiber; $q_{anode}$ represents density of an electric quantity passing through the CFRP winding layer, which is $1.6 \times 10^7$ C/m$^2$, where under the value, an anode reaction system is stable and residual strength efficiency of an anode material of the CFRP winding layer is 68%; $i_p$ represents density of an applied cathodic protection current, which usually ranges from 2 mA/m$^2$ to 20 m mA/m$^2$ and is taken as 20 mA/m$^2$; $\rho$ represents a reinforcement ratio of a tensile steel bar; $A_c$ represents cross-sectional area perpendicular to the CFRP-wrapped composite bar with the SMA embedded with the optical fiber in the smart CFRP-SMA bar reinforced concrete structure; and n represents a quantity of tensile steel bars.

In the present disclosure, a calculation formula for the initial bearing capacity of the smart CFRP-SMA bar reinforced concrete structure is preferably shown in a formula II:

$$M_i = \left( d - \frac{A_s f_y + A_f E_f \varepsilon_{fi}}{1.7 f'_c b} \right) (A_s f_y + A_f E_f \varepsilon_{fi}) \qquad \text{Formula II}$$

In the formula II, assuming that the plain round Fe-SMA bar of the CFRP-wrapped composite bar with the SMA embedded with the optical fiber and the steel bars have same yield strength, namely $f_y$, $A_s$ represents total area of the steel bars and the plain round Fe-SMA bar, d represents an effective height of the smart CFRP-SMA bar reinforced concrete structure, $A_f$ represents cross-sectional area of the CFRP winding layer, $E_f$ represents an elastic modulus of the CFRP winding layer, $\varepsilon_{fi}$ represents the strain of the CFRP winding layer when the normal load is initially applied, $f'_c$ represents strength of concrete, b represents a width of the smart CFRP-SMA bar reinforced concrete structure, and $M_i$ represents the initial bearing capacity of the smart CFRP-SMA bar reinforced concrete structure.

Figure 8:
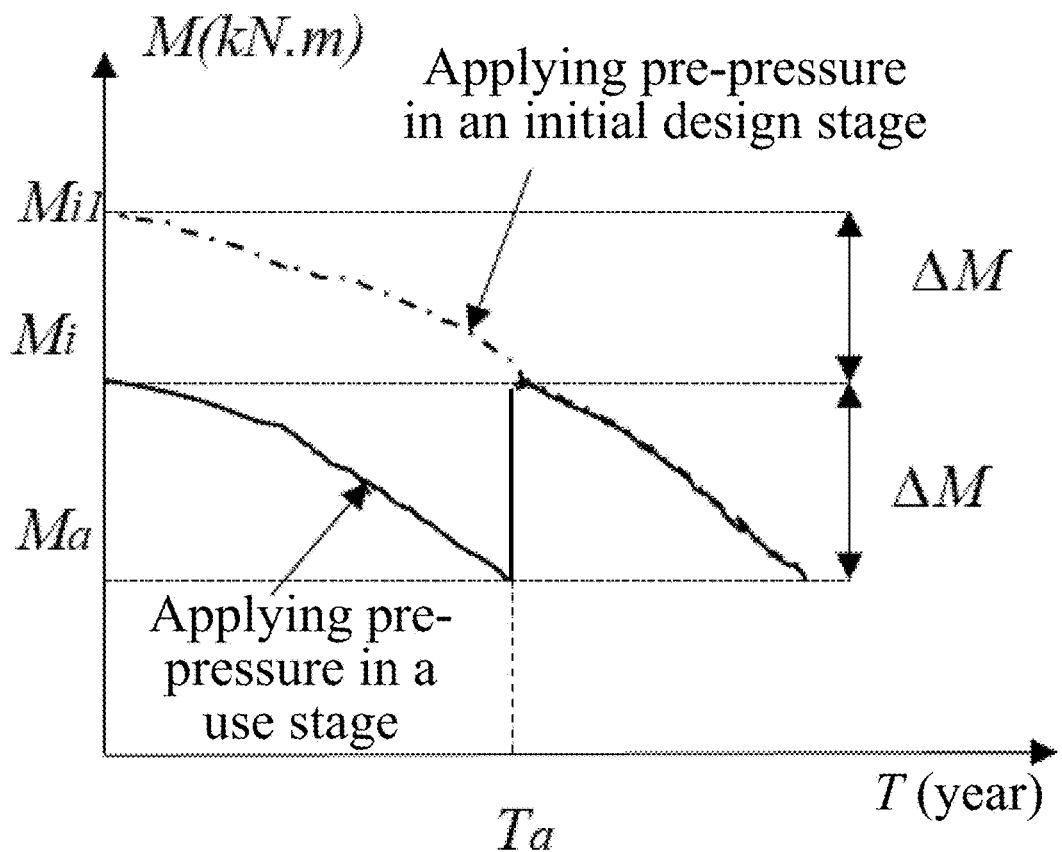
FIG. 8 shows a relationship between a bearing capacity of a smart CFRP-SMA bar reinforced concrete structure and usage time of ICCP in the present disclosure.

As shown in FIG. 8, assuming the designed bearing capacity for the normal use is $M_a$, strength of the CFRP winding layer decreases over time, resulting in degradation of the bearing capacity of the smart CFRP-SMA bar reinforced concrete structure. In order to ensure the normal use of the smart CFRP-SMA bar reinforced concrete structure, the bearing capacity of the smart CFRP-SMA bar reinforced concrete structure should be greater than $M_a$. Therefore, if there is a time point $T_a$, when the monitored bearing capacity of the smart CFRP-SMA bar reinforced concrete structure is equal to $M_a$, the excitation current can be applied to heat the SMA, such that the CFRP-wrapped composite bar with the SMA embedded with the optical fiber which integrates force sensing, stress driving, and structural enhancement generates the pretightening force. The pretightening force can cause an upward antiarch of the smart CFRP-SMA bar reinforced concrete structure, thereby closing cracks and improving the bearing capacity. In this case, in order to ensure safety of the structure, $\Delta M \geq M_i - M_a$ should be met.

In addition, the excitation current can also be applied in the initial design stage to meet the bearing capacity design requirement for the normal use during the service life of the smart CFRP-SMA bar reinforced concrete structure. Therefore, the bearing capacity $M_{i1}$ after the pretightening force is applied in the early design stage needs to meet a following condition: $M_{i1} = M_i + \Delta M$.

Considering that the pretightening force is mainly used to prevent cracking of the concrete and enable the smart CFRP-SMA bar reinforced concrete structure to generate the upward antiarch, and that the CFRP winding layer can take effect only after the pretightening force is used up and the concrete is cracked, a calculation formula for the contribution ΔM generated by the pretightening force to the bearing capacity is preferably shown in a formula III:

$$\Delta M = (\sigma_{pc} - \gamma f_{tk})W_0 \qquad \text{Formula III}$$

$$\gamma = (0.7 - 120/h)\gamma_m \qquad \text{Formula IV}$$

$$\sigma_{pc} = E_{sp}\Delta\varepsilon_{sp} = E_{sp}\left(\Delta l \sum_{i=1}^{u}\varepsilon_{sp,i}\right)/l \qquad \text{Formula V}$$

In the formula III, ΔM represents the contribution generated by the pretightening force to the bearing capacity, $f_{tk}$ represents a standard value of tensile strength of the concrete, $W_0$ represents an elastic resistance moment of a tensile edge of a transformed cross-section, $\gamma_m$ represents a basic value of a plastic influence coefficient of a cross-section resistance moment of the smart CFRP-SMA bar reinforced concrete structure, which is taken as 1.15 for a rectangular cross-section, γ represents the plastic influence coefficient of the cross-section resistance moment of the smart CFRP-SMA bar reinforced concrete structure, which is calculated according to the formula IV, $\sigma_{pc}$ represents pre-stress of the plain round Fe-SMA bar of the CFRP-wrapped composite bar with the SMA embedded with the optical fiber, which is calculated according to the formula V, $E_{sp}$ represents an elastic modulus of the CFRP-wrapped composite bar with the SMA embedded with the optical fiber, Δl represents spatial resolution of distributed optical fiber sensing acquisition, u represents a total quantity of measurement points for distributed optical fiber acquisition, i represents a measurement point for the distributed optical fiber acquisition, $\varepsilon_{sp,i}$ represents strain at an $i^{th}$ measurement point after the excitation current is applied, l represents a total length of a distributed optical fiber sensing measurement section, and $\Delta\varepsilon_{sp}$ represents the average strain of the CFRP-wrapped composite bar with the SMA embedded with the optical fiber after the excitation current is applied.

When the designed bearing capacity for the normal use is $M_a$, before the excitation current is applied, after cathodic protection, strength of the CFRP winding layer decreases due to the deterioration of the CFRP winding layer. In order to ensure safety of using the smart CFRP-SMA bar reinforced concrete structure, the strength of the CFRP winding layer is usually deteriorated by at most 0.68 $f_{fu}$. In addition, the deterioration of the strength of the CFRP winding layer can also lead to an increase in the strain of the CFRP winding layer. $M_i = M_a$ is substituted into the formula II to obtain the strain $\varepsilon_{fa}$ of the CFRP winding layer when the excitation current needs to be applied. A calculation formula for the strain $\varepsilon_{fa}$ of the CFRP winding layer when the excitation current is applied is preferably shown in a formula VI:

$$\varepsilon_{fa} = \left(-B + \sqrt{B^2 - 4AC}\right)/2A \qquad \text{Formula VI}$$

In the above formula, $A = -A_f^2 E_f^2$, $B = 2A_s f_y A_f E_f - 1.7 f_c' b dE_f$, and $C = 1.7 f_c' f_y b d A_s - 1.7 f_c' b M_a - A_s^2 A_f^2$.

Assuming that axial force of the CFRP-wrapped composite bar with the SMA embedded with the optical fiber remains unchanged before the excitation current is applied, the stress $f_{fa}$ of the CFRP winding layer when the excitation current is applied can be preferably obtained as shown in a formula VII:

$$f_{fa} = \varepsilon_{fi}(E_f + E_s A_s/A_f) - \varepsilon_{fa} E_s A_s/A_f \qquad \text{Formula VII}$$

Figure 9:
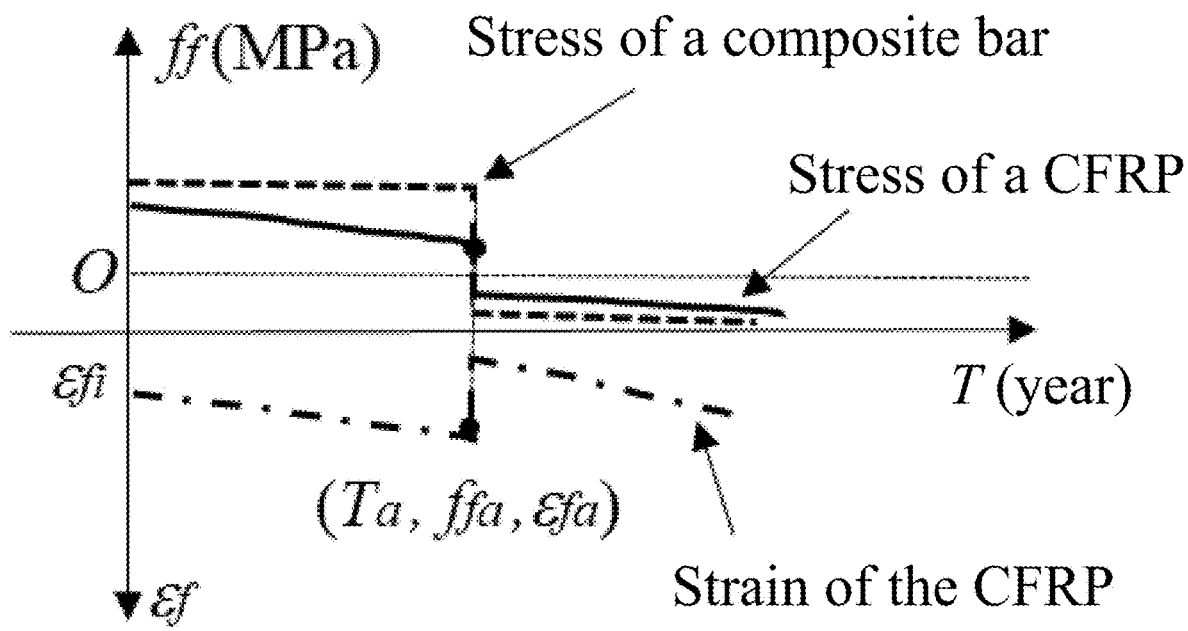
FIG. 9 shows a relationship between strength and strain of outer-layer CFRP and usage time of ICCP in the present disclosure.

FIG. 9 shows a relationship between strength and strain of an outer-layer CFRP, stress of the composite bar, and a service life when the designed bearing capacity for the normal use is $M_a$. Before the excitation current is applied, it is assumed that the axial force of the CFRP-wrapped composite bar with the SMA embedded with the optical fiber remains unchanged. As the wrapped CFRP winding layer serves as an auxiliary anode for the cathodic protection, the stress of the CFRP winding layer decreases due to the deterioration of the strength of the CFRP winding layer. However, the strain of the CFRP winding layer increases from the initial strain $\varepsilon_{fi}$. Assuming that the inner core of the SMA and the CFRP winding layer work together, it is considered that monitored strain of the optical fiber is equal to the strain of the CFRP winding layer. When the optical fiber detects that the strain of the CFRP winding layer increases to $\varepsilon_{fa}$, the excitation current can be activated. After the excitation current is applied, pressure is generated through the self-driving of the composite bar, causing the stress of the CFRP winding layer and the stress of the CFRP-wrapped composite bar with the SMA embedded with the optical fiber to decrease from tensile force or even change to pressure. Meanwhile, the strain of the CFRP winding layer also decreases with the generation of the pressure.

FIG. 10 is a flowchart of a performance improvement method for deterioration of a new structure system in which the outer-layer CFRP (the CFRP winding layer) of the CFRP-wrapped composite bar with the SMA embedded with the optical fiber which integrates the cathodic protection, the force sensing, the stress adjustment, and the structural enhancement serves as an auxiliary anode of an ICCP technology. As shown in FIG. 10, design parameters of the component (the smart CFRP-SMA bar reinforced concrete structure) are input, the service life of the ICCP system is calculated, the normal service load is applied, the initial bearing capacity is calculated, the ICCP system is turned on, and the strain of the outer-layer CFRP (the CFRP winding layer) is monitored. If the strain $\varepsilon_f$ of the CFRP winding layer after the normal service load is applied is greater than the strain $\varepsilon_{fa}$ of the CFRP winding layer when the excitation current is applied, and the power-on time T of the ICCP system is less than or equal to the service life $t_{life}$ of the smart CFRP-SMA bar reinforced concrete structure, the excitation current is applied to generate the pretightening force. The contribution ΔM to the bearing capacity after the pretightening force is applied is calculated. If $\Delta\varepsilon_{sp} \geq \varepsilon_{fa} - \varepsilon_{fi}$, $\Delta M \geq M_i - M_a$, and the bearing capacity after the deterioration meets the design requirement, the process ends. If $\Delta\varepsilon_{sp} < \varepsilon_{fa} - \varepsilon_{fi}$ or $\Delta M < M_i - M_a$, the excitation current is continuously applied until $\Delta\varepsilon_{sp} \geq \varepsilon_{fa} - \varepsilon_{fi}$ and $\Delta M \geq M_i - M_a$. If $\varepsilon_f \leq \varepsilon_{fa}$, the strain of the outer-layer CFRP is continuously monitored. If $\varepsilon_f \leq \varepsilon_{fa}$ and $T > t_{life}$, the process ends because the requirement for safe use is not met. Alternatively, after the normal service load is applied and before the CFRP winding layer deteriorates, the excitation current is applied to generate the pretightening force, and the contribution $\Delta M$ to the bearing capacity after the pretightening force is applied is calculated. If $\Delta\varepsilon_{sp} \geq \varepsilon_{fa} - \varepsilon_{fi}$ and $\Delta M \geq M_t - M_a$, the bearing capacity after the deterioration meets the design requirement. If $\Delta\varepsilon_{sp} < \varepsilon_{fa} - \varepsilon_{fi}$ or $\Delta M < M_t - M_a$, the excitation current is continuously applied and activated until $\Delta\varepsilon_{sp} \geq \varepsilon_{fa} - \varepsilon_{fi}$ and $\Delta M \geq M_t - M_a$. The bearing capacity $M_{i1}$ of the smart CFRP-SMA bar reinforced concrete structure after the pretightening force is applied in the initial design stage is calculated, where $M_{i1}$=the sum of the contribution $\Delta M$ generated by the pretightening force to the bearing capacity and the initial bearing capacity $M_i$ of the smart CFRP-SMA bar reinforced concrete structure. After the excitation current is applied, the ICCP system is turned on. When $M_{i1} \geq M_a$, the strain of the CFRP winding layer is continuously monitored. When $M_{i1} < M_a$, the strain of the CFRP winding layer is monitored. When $\varepsilon_f > \varepsilon_{fa}$ and $T \leq t_{life}$, the excitation current is continuously applied to the plain round Fe-SMA bar of the CFRP-wrapped composite bar with the SMA embedded with the optical fiber until $\Delta\varepsilon_{sp} \geq \varepsilon_{fa} - \varepsilon_{fi}$ and $\Delta M \geq M_t - M_a$.

The present disclosure provides a new structure system in which a CFRP winding layer (outer-layer CFRP) of a CFRP-wrapped composite bar with SMA embedded with an optical fiber, which integrates cathodic protection, force sensing, stress adjustment, and structural enhancement, serves as an auxiliary anode of an ICCP technology, and an enhancement method. For example, a concrete beam mainly consists of concrete, bottom tensile steel bars, a CFRP-wrapped composite bar with SMA embedded with an optical fiber, which integrates cathodic protection, force sensing, stress adjustment, and structural enhancement, and a reinforcing cage. The CFRP-wrapped composite bar with the SMA embedded with the optical fiber which integrates the cathodic protection, the force sensing, the stress adjustment, and the structural enhancement uses Fe-SMA with a surface notch groove and embedded with an optical fiber sensor as an inner core, and has characteristics of self-resetting to apply prestress, prestress loss self-sensing, and structural enhancement. This structure system effectively solves problems of durability, in-service real-time smart sensing and bearing capacity control of a structure in a coastal environment, and also solves a performance degradation problem caused by CFRP deterioration in a traditional ICCP process.

A carbon fiber material in a CFRP-wrapped composite bar has excellent mechanical, electrical, and electrochemical properties, and is a superior auxiliary anode material. The carbon fiber material can stably control a polarization potential of the steel bars in a corrosion-resistant zone, effectively controlling corrosion of the steel bars. Compared with a commonly-used metal auxiliary anode, the carbon fiber material has characteristics of good electrochemical stability, strong tolerance, a low operating voltage, a low consumption rate, and a long service life. In addition, the CFRP-wrapped composite bar can also be poured into the concrete as a structural enhancement material. However, when the CFRP is used as the auxiliary anode, its strength may decrease due to deterioration. The SMA is a special type of metal alloy that has a unique property of being able to recover to its original shape through heating or other means after undergoing a certain deformation. The SMA is used as an inner core of the CFRP-wrapped composite bar. In this way, the strength decrease caused by the deterioration when the outer-layer CFRP is used as the auxiliary anode can be made up by applying an excitation current to generate pretightening force, thereby improving a structural enhancement effect.

The technical solutions in the present disclosure will be described below clearly and completely with reference to the embodiments in the present disclosure, but they shall not be construed as limiting the scope of protection of the present disclosure.

Embodiment 1

A smart CFRP-SMA bar reinforced concrete structure (concrete beam) is 3000 mm long, 250 mm high, and 150 mm wide, with a net span of 2500 mm. A steel bar configuration is shown in FIG. 6. Two steel bars with a diameter of 14 mm and one 14 mm CFRP-wrapped composite bar with SMA embedded with an optical fiber which integrates cathodic protection, force sensing, stress adjustment, and structural enhancement are used on a bottom tension side of the beam. The composite bar is placed in the middle, and the steel bars are placed on two sides. In order to ensure that the beam has a sufficient shear-bearing capacity, a stirrup is a plain round bar with a diameter of 8 mm and has a diameter of 150 mm. After a reinforcing cage is bound, in order to provide cathodic protection for longitudinal steel bars, metal wires for the cathodic protection are separately connected to surfaces of the longitudinal steel bars and a CFRP winding layer (with a thickness of 2 mm) of the CFRP-wrapped composite bar with the SMA embedded with the optical fiber. The CFRP winding layer of the CFRP-wrapped composite bar with the SMA embedded with the optical fiber is connected to a positive terminal of a first external power supply through the metal wire, and the steel bars are connected to a negative terminal of the first external power supply through the metal wires. A left end of a plain round Fe-SMA bar of the CFRP-wrapped composite bar with the SMA embedded with the optical fiber is connected to a negative terminal of a second power supply through a metal wire, and a right end of the plain round Fe-SMA bar is connected to a positive terminal of the second power supply through a metal wire. Concrete is poured, and curing is performed. When a cathodic protection current is applied, the CFRP winding layer is connected to the positive terminal of the first power supply as an anode material, and the steel bars are connected to the negative terminal of the first power supply as a cathode material, such that an ICCP system is formed. The plain round Fe-SMA bar and the second power supply connected to the two ends of the plain round Fe-SMA bar form an ICCP system deterioration enhancement system.

Steps for preparing the CFRP-wrapped composite bar with the SMA embedded with the optical fiber are as follows:

The plain round Fe-SMA bar is pre-tensioned based on designed pre-tensile strain, and an elongation of the pre-tensioned plain round Fe-SMA bar is 3%. A metal notching machine is used to notch a 1 mm×1 mm square groove along a length direction of the plain round Fe-SMA bar. Rust stains are removed from an outer surface of an inner core of the notched plain round Fe-SMA bar through sandpapering, and then the inner core of the notched plain round Fe-SMA bar is cleaned with acetone. After drying at 35° C. for 5 hours, a layer of 0.3 mm thick insulating paint is coated on the outer surface of the inner core of the notched plain round Fe-SMA bar 5. A metal wire is connected to one end of the plain round Fe-SMA bar 5 to apply an excitation current during later use. A sheathing optical cable (with a diameter of less than 0.9 mm, including a glass fiber inner core, a polyimide coating layer, and a polyurethane wrapping layer that are stacked sequentially from inside to outside) is buried at a bottom of the notch groove of the plain round Fe-SMA bar, kept in a tightened state, and fixed with a scotch tape to ensure a position of the sheathing optical cable. Then glue is placed in the groove to avoid relative slippage between the sheathing optical cable and the plain round Fe-SMA bar. After the sheathing optical cable is implanted, within a range of 10 mm from the two ends of the notched plain round Fe-SMA bar, there is no need to use glue for sealing, and a corrugated casing with a diameter of 1 mm and at least 20 mm shorter than the sheathing optical cable is sleeved into two ends of the sheathing optical cable, and placed in an end portion of the notch groove of the unsealed section to prevent the sheathing optical cable from being damaged at a large angle at an end portion of the notched plain round Fe-SMA bar. Epoxy resin is brushed on a fiber cloth. After the epoxy resin is fully impregnated, the outer surface of the inner core of the plain round Fe-SMA bar is wrapped with the carbon fiber cloth to form a plain round bar. A direction of a carbon fiber in the carbon fiber cloth is consistent with that of the plain round Fe-SMA bar. After the carbon fiber cloth is solidified, hoop winding is performed by 90 degrees on an epoxy resin-impregnated fiber bundle along the length direction of the plain round Fe-SMA bar to form a plain round Fe-SMA bar wrapped with the CFRP winding layer (with the thickness of 2 mm). The two ends of the sheathing optical cable are penetrated into a tightening sheath with a diameter 1 mm larger than a diameter of the plain round Fe-SMA bar wrapped with the CFRP winding layer. The tightening sheath is sleeved into the end portion of the plain round Fe-SMA bar wrapped with the CFRP winding layer by 20 mm, and the tightening sheath is at least 50 mm shorter than the sheathing optical cable to facilitate subsequent fusion jointing of the sheathing optical cable with an optical fiber jumper. The corrugated casing is at least 30 mm longer than the tightening sheath to facilitate subsequent connection of a wire for the excitation current. Finally, the tightening sheath is heated with a heat gun to perform contraction due to heat. In order to ensure efficiency of anchoring between a reinforcement material and the concrete in a tensioning process and reduce a prestress loss, an outer surface of the CFRP winding layer 8 is wound with the fiber bundle to form a ribbed structure. The ribbed structure is 5 mm wide and 2 mm high, and has a spacing of 5 mm. In this way, the CFRP-wrapped composite bar with the SMA embedded with the optical fiber which integrates the cathodic protection, the force sensing, the stress adjustment, and the structural enhancement is obtained.

Embodiment 2

A smart CFRP-SMA bar reinforced concrete structure (concrete beam) is 3000 mm long, 250 mm high, and 150 mm wide, with a net span of 2500 mm. A steel bar configuration is shown in FIG. 6. Two steel bars with a diameter of 14 mm and one 14 mm CFRP-wrapped composite bar with SMA embedded with an optical fiber which integrates force sensing, stress driving, and structural enhancement are used on a bottom tension side of the beam. The composite bar is placed in the middle, and the steel bars are placed on two sides. In order to ensure that the beam has a sufficient shear-bearing capacity, a stirrup is a plain round bar with a diameter of 8 mm and has a diameter of 150 mm. After a reinforcing cage is bound, in order to provide cathodic protection for longitudinal steel bars, metal wires for the cathodic protection are separately connected to surfaces of the longitudinal steel bars and a CFRP winding layer (with a thickness of 2 mm) of the CFRP-wrapped composite bar with the SMA embedded with the optical fiber. The CFRP winding layer of the CFRP-wrapped composite bar with the SMA embedded with the optical fiber is connected to a positive terminal of a first external power supply through the metal wire, and the steel bars are connected to a negative terminal of the first external power supply through the metal wire. A left end of a plain round Fe-SMA bar of the CFRP-wrapped composite bar with the SMA embedded with the optical fiber is connected to a negative terminal of a second power supply through a metal wire, and a right end of the plain round Fe-SMA bar is connected to a positive terminal of the second power supply through a metal wire. Concrete is poured, and curing is performed. When a cathodic protection current is applied, the CFRP winding layer is connected to the positive terminal of the power supply as an anode material, and the steel bars are connected to the negative terminal of the power supply as a cathode material, such that an ICCP deterioration enhancement system is formed. A designed bearing capacity $M_a$ of the concrete beam for normal use is 20 kN·m.

A process of applying an excitation current after deterioration of the CFRP winding layer is as follows:

1. Input component design parameters, including a height, a width, material parameters, and other data of the beam.

2. Calculate a service life of an ICCP system according to the formula I:

A calculation formula for a service life of the smart CFRP-SMA bar reinforced concrete structure is preferably obtained according to the formula I:

$$t_{life} = A_a q_{anode}/(i_p \sqrt{4\pi n A_c \rho}) = 12.86 \text{ years}.$$

In the formula I, $t_{life}$ represents the service life of the smart CFRP-SMA bar reinforced concrete structure; $A_a$(0.04396) represents surface area per unit length of the CFRP winding layer of the CFRP-wrapped composite bar with the SMA embedded with the optical fiber; $q_{anode}$ represents density of an electric quantity passing through the CFRP winding layer, which is $1.6 \times 10^7$ C/m$^2$, where under the value, an anode reaction system is stable and residual strength efficiency of an anode material of the CFRP winding layer is 68%; $i_p$ represents density of the applied cathodic protection current, which usually ranges from 2 mA/m$^2$ to 20 mA/m$^2$ and is taken as 20 mA/m$^2$; $\rho$ represents a reinforcement ratio of a tensile steel bar; $A_c$(0.0000785) represents cross-sectional area perpendicular to the CFRP-wrapped composite bar with the SMA embedded with the optical fiber in the smart CFRP-SMA bar reinforced concrete structure; and n represents a quantity of tensile steel bars.

3. Apply a normal service load, and calculate an initial bearing capacity based on monitored strain ($\varepsilon_{fi}$=0.002) of the optical fiber.

In the present disclosure, a calculation formula for the initial bearing capacity of the smart CFRP-SMA bar reinforced concrete structure is preferably shown in the formula II:

$$M_i = \left(d - \frac{A_s f_y + A_f E_f \varepsilon_{fi}}{1.7 f'_c b}\right)(A_s f_y + A_f E_f \varepsilon_{fi}) = 30 kN \cdot m \quad \text{Formula II}$$

In the formula II, assuming that the plain round Fe-SMA bar of the CFRP-wrapped composite bar with the SMA embedded with the optical fiber and the steel bars have same yield strength, namely $f_y$=300 MPa, $A_s$=386 mm$^2$ represents total area of the steel bars and the plain round Fe-SMA bar, d=225 mm represents an effective height of the smart CFRP-SMA bar reinforced concrete structure, $A_f$=75.36 mm² represents cross-sectional area of the CFRP winding layer, $E_f$=200 GPa represents an elastic modulus of the CFRP winding layer, $\varepsilon_{fi}$=0.002 represents strain of the CFRP winding layer when the normal load is initially applied, $f_c'$=30 MPa represents strength of the concrete, b=150 mm represents a width of the smart CFRP-SMA bar reinforced concrete structure, and the calculated initial bearing capacity $M_i$ of the smart CFRP-SMA bar reinforced concrete structure is equal to 30 kN·m.

4. Calculate strain $\varepsilon_{fa}$ of the CFRP winding layer when the excitation current needs to be applied, which is 0.016. If the monitored strain $\varepsilon_f$ of the optical fiber is less than or equal to $\varepsilon_{fa}$, the monitoring is continuously performed. If $\varepsilon_f > \varepsilon_{fa}$ and T<$t_{life}$, deterioration can be carried out, and the excitation current is applied.

Deterioration of strength of the CFRP winding layer can also lead to an increase in the strain of the CFRP winding layer. $M_i$=$M_a$ is substituted into the formula II to obtain the strain $\varepsilon_{fa}$ of the CFRP winding layer when the excitation current needs to be applied, namely $\varepsilon_{fa}$=0.016. A calculation formula for the strain $\varepsilon_{fa}$ of the CFRP winding layer when the excitation current is applied is preferably shown in the formula VI:

$$\varepsilon_{fa} = \left(-B + \sqrt{B^2 - 4AC}\right)/2A \quad \text{Formula VI}$$

In the above formula, $A = -A_f^2 E_f^2$, $B = -2A_s f_y A_f E_f - 1.7 f_c' b \cdot d E_f$, and $C = 1.7 f_c' f_y b d A_s - 1.7 f_c' b M_a - A_s^2 A_f^2$.

5. Determine whether the ICCP system has reached its service life; and carry out deterioration enhancement if the power-on time T of the ICCP system is less than $t_{life}$; or end the process when the residual strength efficiency of the anode material of the CFRP winding layer is less than 68%, and the structure does not meet a requirement for safe use.

6. Calculate average strain $\Delta\varepsilon_{sp}$ of the CFRP-wrapped composite bar with the SMA embedded with the optical fiber after the excitation current is actually applied and a contribution $\Delta M$ to the bearing capacity after the excitation current is applied. When $\Delta\varepsilon_{sp} \geq \varepsilon_{fa} - \varepsilon_{fi}$ and $\Delta M \geq M_i - M_a$, the deterioration enhancement process is completed. Otherwise, the excitation current is continuously applied to adjust pretightening force.

The average strain $\Delta\varepsilon_{sp}$ of the CFRP-wrapped composite bar with the SMA embedded with the optical fiber after the excitation current is actually applied is greater than or equal to $\varepsilon_{fa} - \varepsilon_{fi}$, namely 0.014.

According to the formulas III, IV, and V, the contribution generated by the pretightening force to the bearing capacity can be calculated.

$$\Delta M = (\sigma_{pc} - \gamma f_{tk})W_0 \quad \text{Formula III}$$

$$\gamma = (0.7 - 120/h)\gamma_m \quad \text{Formula IV}$$

$$\sigma_{pc} = E_{sp}\Delta\varepsilon_{sp} = E_{sp}\left(\Delta l \sum_{i=1}^{u} \varepsilon_{sp,i}\right)/l \quad \text{Formula V}$$

In the formula III, the calculated contribution $\Delta M$ generated by the pretightening force to the bearing capacity is equal to 14.3 kN·m, $f_{tk}$ represents a standard value of tensile strength of the concrete, $W_0$=0.000195 represents an elastic resistance moment of a tensile edge of a transformed cross-section, $\gamma_m$ represents a basic value of a plastic influence coefficient of a cross-section resistance moment of the smart CFRP-SMA bar reinforced concrete structure, which is taken as 1.15 for a rectangular cross-section, $\gamma$=0.115 represents the plastic influence coefficient of the cross-section resistance moment of the smart CFRP-SMA bar reinforced concrete structure, which is calculated according to the formula IV, $\sigma_{pc}$ represents pre-stress of the plain round Fe-SMA bar of the CFRP-wrapped composite bar with the SMA embedded with the optical fiber, which can be calculated according to the formula V, $E_{sp}$ represents an elastic modulus of the CFRP-wrapped composite bar with the SMA embedded with the optical fiber, $\Delta l$ represents spatial resolution of distributed optical fiber sensing acquisition, u represents a total quantity of measurement points for distributed optical fiber acquisition, i represents a measurement point for the distributed optical fiber acquisition, $\varepsilon_{sp,i}$ represents strain at an $i^{th}$ measurement point after the excitation current is applied, l represents a total length of a distributed optical fiber sensing measurement section, and $\Delta\varepsilon_{sp}$=0.014 represents the average strain of the CFRP-wrapped composite bar with the SMA embedded with the optical fiber after the excitation current is applied.

A process of applying an excitation current before deterioration of the CFRP winding layer is as follows:

1. Input component design parameters, including a height, a width, material parameters, and other data of the beam.

2. Calculate a service life of an ICCP system according to a formula I:

A calculation formula for a service life of the smart CFRP-SMA bar reinforced concrete structure is preferably obtained according to the formula I:

$$t_{life} = A_a q_{anode}/\left(i_p \sqrt{4\pi n A_c \rho}\right) = 12.86 \text{ years}.$$

In the formula I, $t_{life}$ represents the service life of the smart CFRP-SMA bar reinforced concrete structure; $A_a$(0.04396) represents surface area per unit length of the CFRP winding layer of the CFRP-wrapped composite bar with the SMA embedded with the optical fiber; $q_{anode}$ represents density of an electric quantity passing through the CFRP winding layer, which is $1.6 \times 10^7$ C/m², where under the value, an anode reaction system is stable and residual strength efficiency of an anode material of the CFRP winding layer is 68%; $i_p$ represents density of the applied cathodic protection current, which usually ranges from 2 mA/m² to 20 mA/m² and is taken as 20 mA/m²; $\rho$ represents a reinforcement ratio of a tensile steel bar; $A_c$(0.0000785) represents cross-sectional area perpendicular to the CFRP-wrapped composite bar with the SMA embedded with the optical fiber in the smart CFRP-SMA bar reinforced concrete structure; and n represents a quantity of tensile steel bars.

3. Apply a normal service load, and calculate an initial bearing capacity based on monitored strain ($\varepsilon_{fi}$=0.002) of the optical fiber.

In the present disclosure, a calculation formula for the initial bearing capacity of the smart CFRP-SMA bar reinforced concrete structure is preferably shown in a formula II:

$$M_i = \left(d - \frac{A_s f_y + A_f E_f \varepsilon_{fi}}{1.7 f_c' b}\right)(A_s f_y + A_f E_f \varepsilon_{fi}) = 30 kN \cdot m \quad \text{Formula II}$$

In the formula II, assuming that the plain round Fe-SMA bar of the CFRP-wrapped composite bar with the SMA embedded with the optical fiber and the steel bars have same yield strength, namely $f_y=300$ MPa, $A_s=386$ mm² represents total area of the steel bars and the plain round Fe-SMA bar, d=225 mm represents an effective height of the smart CFRP-SMA bar reinforced concrete structure, $A_f=75.36$ mm² represents cross-sectional area of the CFRP winding layer, $E_f=200$ GPa represents an elastic modulus of the CFRP winding layer, $\varepsilon_{fi}=0.002$ represents strain of the CFRP winding layer when the normal load is initially applied, $f_c'=30$ MPa represents strength of the concrete, b=150 mm represents a width of the smart CFRP-SMA bar reinforced concrete structure, and the calculated initial bearing capacity $M_i$ of the smart CFRP-SMA bar reinforced concrete structure is equal to 30 kN·m.

4. Calculate average strain $\Delta\varepsilon_{sp}$ of the CFRP-wrapped composite bar with the SMA embedded with the optical fiber after the excitation current is actually applied. Calculate strain $\varepsilon_{fa}$ of the CFRP winding layer when the excitation current needs to be applied, which is equal to 0.016. Calculate a contribution: $\Delta M$ to the bearing capacity after the excitation current is applied. When $\Delta\varepsilon_{sp} \geq \varepsilon_{fa} - \varepsilon_{fi}$ and $\Delta M \geq M_i - M_a$, the deterioration enhancement process is completed. Otherwise, the excitation current is continuously applied to adjust pretightening force.

5. Monitor stain of the optical fiber; and continuously perform the monitoring if the monitored strain $\varepsilon_f$ of the optical fiber is less than $\varepsilon_{fa}$, or apply the excitation current if $\varepsilon_f > \varepsilon_{fa}$ and $T < t_{life}$.

6. Determine whether the ICCP system has reached its service life; and carry out deterioration enhancement if the power-on time T of the ICCP system is less than $t_{life}$; or end the process when the residual strength efficiency of the anode material of the CFRP winding layer is less than 68%, and the structure does not meet a requirement for safe use.

7. Calculate the contribution $\Delta M$ to the bearing capacity and the average strain $\Delta\varepsilon_{sp}$ of the CFRP-wrapped composite bar with the SMA embedded with the optical fiber after the excitation current is applied. When $\Delta\varepsilon_{sp} \geq \varepsilon_{fa} - \varepsilon_{fi}$ and $\Delta M \geq M_i - M_a$, the deterioration enhancement process is completed. Otherwise, the excitation current is continuously applied to adjust pretightening force.

Although the above embodiments have described the present disclosure in detail, they are only a part of, not all of, the embodiments of the present disclosure. Other embodiments may also be obtained by persons based on the embodiments without creative efforts, and all of these embodiments shall fall within the protection scope of the present disclosure.

What is claimed is:

1. An enhancement method for a deterioration of an impressed current cathodic protection (ICCP) system, comprising:

applying an excitation current to a plain round Fe-shape memory alloy (SMA) bar of a carbon fiber reinforced polymer (CFRP)-wrapped composite bar with an SMA embedded with an optical fiber in a smart CFRP-SMA bar reinforced concrete structure integrating cathodic protection, force sensing and bearing capacity self-adjustment, such that the CFRP-wrapped composite bar with the SMA embedded with the optical fiber generates a pretightening force, wherein the pretightening force generates a contribution $\Delta M$ to a bearing capacity of the smart CFRP-SMA bar reinforced concrete structure, thereby enhancing the deterioration of the ICCP system; wherein applying the excitation current comprises: applying the excitation current to the plain round Fe-SMA bar of the CFRP-wrapped composite bar with the SMA embedded with the optical fiber after a CFRP winding layer deteriorates when the ICCP system is turned on, or directly applying the excitation current to the plain round Fe-SMA bar of the CFRP-wrapped composite bar with the SMA embedded with the optical fiber when the CFRP winding layer does not deteriorate before the ICCP system is turned on, wherein when a strain $\varepsilon_f$ of the CFRP winding layer after a normal service load is applied is greater than a strain $\varepsilon_{fa}$ of the CFRP winding layer when the excitation current is applied, and a power-on time T of the ICCP system is less than or equal to a service life $t_{life}$ of the smart CFRP-SMA bar reinforced concrete structure, the excitation current is applied to the plain round Fe-SMA bar of the CFRP-wrapped composite bar with the SMA embedded with the optical fiber after the CFRP winding layer deteriorates when the ICCP system is turned on; a strain of the CFRP winding layer is continuously monitored when $\varepsilon_f \leq \varepsilon_{fa}$; and a process is ended because a requirement for a safe use is not met when $\varepsilon_f > \varepsilon_{fa}$ and $T > t_{life}$; or when the excitation current is directly applied to the plain round Fe-SMA bar of the CFRP-wrapped composite bar with the SMA embedded with the optical fiber when the CFRP winding layer does not deteriorate before the ICCP system is turned on, a bearing capacity $M_{i1}$ of the smart CFRP-SMA bar reinforced concrete structure after the pretightening force is applied in an initial design stage is calculated, wherein $M_{i1}$ is equal to a sum of the contribution $\Delta M$ generated by the pretightening force to the bearing capacity and an initial bearing capacity $M_i$ of the smart CFRP-SMA bar reinforced concrete structure; after the excitation current is applied, the ICCP system is turned on; and when $M_{i1} > M_a$, the strain of the CFRP winding layer is continuously monitored; or when $M_{i1} < M_a$, the strain of the CFRP winding layer is monitored, and if $\varepsilon_f > \varepsilon_{fa}$ and $T \leq t_{life}$, the excitation current is continuously applied to the plain round Fe-SMA bar of the CFRP-wrapped composite bar with the SMA embedded with the optical fiber; and a value of the excitation current satisfies: an average strain $\Delta\varepsilon_{sp}$ of the CFRP-wrapped composite bar with the SMA embedded with the optical fiber after the excitation current is applied is greater than or equal to a difference between the strain $\varepsilon_{fa}$ of the CFRP winding layer when the excitation current is applied and a strain $\varepsilon_{fi}$ of the CFRP winding layer when the normal service load is initially applied, and the contribution $\Delta M$ generated by the pretightening force to the bearing capacity is greater than or equal to a difference between the initial bearing capacity $M_i$ of the smart CFRP-SMA bar reinforced concrete structure and a designed bearing capacity $M_a$ of the smart CFRP-SMA bar reinforced concrete structure for normal use;

wherein a calculation formula for the service life of the smart CFRP-SMA bar reinforced concrete structure is obtained according to a formula I:

$$t_{life} = A_a q_{anode} / \left( i_p \sqrt{4\pi n A_c \rho} \right) \quad \text{Formula I}$$

wherein in the formula I, $t_{life}$ represents the service life of the smart CFRP-SMA bar reinforced concrete structure; $A_a$ represents a surface area per unit length of the CFRP winding layer of the CFRP-wrapped composite bar with the SMA embedded with the optical fiber; $q_{anode}$ represents a density of an electric quantity passing through the CFRP winding layer with a value of $1.6 \times 10^7$ C/m², wherein under the value of $1.6 \times 10^7$ C/m², an anode reaction system is stable and a residual strength efficiency of an anode material of the CFRP winding layer is 68%; $i_p$ represents a density of an applied cathodic protection current, wherein $i_p$ ranges from 2 mA/m² to 20 mA/m² and is taken as 20 mA/m²; ρ represents a reinforcement ratio of a tensile steel bar; $A_c$ represents a cross-sectional area perpendicular to the CFRP-wrapped composite bar with the SMA embedded with the optical fiber in the smart CFRP-SMA bar reinforced concrete structure; and n represents a quantity of tensile steel bars;

wherein a calculation formula for the initial bearing capacity of the smart CFRP-SMA bar reinforced concrete structure is shown in a formula II:

$$M_i = \left(d - \frac{A_s f_y + A_f E_f \varepsilon_{fi}}{1.7 f'_c b}\right)(A_s f_y + A_f E_f \varepsilon_{fi}) \quad \text{Formula II}$$

wherein in the formula II, assuming that the plain round Fe-SMA bar of the CFRP-wrapped composite bar with the SMA embedded with the optical fiber and the steel bars have a same yield strength of $f_y$, $A_s$ represents a total area of the steel bars and the plain round Fe-SMA bar, d represents an effective height of the smart CFRP-SMA bar reinforced concrete structure, $A_f$ represents a cross-sectional area of the CFRP winding layer, $E_f$ represents an elastic modulus of the CFRP winding layer, $\varepsilon_{fi}$ represents the strain of the CFRP winding layer when the normal service load is initially applied, $f_c'$ represents a strength of a concrete, b represents a width of the smart CFRP-SMA bar reinforced concrete structure, and $M_i$ represents the initial bearing capacity of the smart CFRP-SMA bar reinforced concrete structure;

wherein a calculation formula for the contribution $\Delta M$ generated by the pretightening force to the bearing capacity is shown in a formula III:

$$\Delta M = (\sigma_{pc} - \gamma f_{tk})W_0 \quad \text{Formula III}$$

$$\gamma = (0.7 - 120/h)\gamma_m \quad \text{Formula IV}$$

$$\sigma_{pc} = E_{sp}\Delta\varepsilon_{sp} = E_{sp}\left(\Delta l \sum_{i=1}^{u} \varepsilon_{sp,i}\right)/l \quad \text{Formula V}$$

wherein in the formula III, $\Delta M$ represents the contribution generated by the pretightening force to the bearing capacity, $f_{tk}$ represents a standard value of a tensile strength of the concrete, $W_0$ represents an elastic resistance moment of a tensile edge of a transformed cross-section, $\gamma_m$ represents a basic value of a plastic influence coefficient of a cross-section resistance moment of the smart CFRP-SMA bar reinforced concrete structure, wherein $\gamma_m$ is taken as 1.15 for a rectangular cross-section, γ represents the plastic influence coefficient of the cross-section resistance moment of the smart CFRP-SMA bar reinforced concrete structure, wherein γ is calculated according to the formula IV, $\sigma_{pc}$ represents a pre-stress of the plain round Fe-SMA bar of the CFRP-wrapped composite bar with the SMA embedded with the optical fiber, wherein $\sigma_{pc}$ is calculated according to the formula V, $E_{sp}$ represents an elastic modulus of the CFRP-wrapped composite bar with the SMA embedded with the optical fiber, $\Delta l$ represents a spatial resolution of a distributed optical fiber sensing acquisition, u represents a total quantity of measurement points for the distributed optical fiber sensing acquisition, i represents a measurement point for the distributed optical fiber sensing acquisition, $\varepsilon_{sp,i}$ represents a strain at an $i^{th}$ measurement point after the excitation current is applied, l represents a total length of a distributed optical fiber sensing measurement section, and $\Delta\varepsilon_{sp}$ represents the average strain of the CFRP-wrapped composite bar with the SMA embedded with the optical fiber after the excitation current is applied;

wherein a calculation formula for the strain $\varepsilon_{fa}$ of the CFRP winding layer when the excitation current is applied is shown in a formula VI:

$$\varepsilon_{fa} = \left(-B + \sqrt{B^2 - 4AC}\right)/2A \quad \text{Formula VI}$$

wherein $A = -A_f^2 E_f^2$, $B = 2A_s f_y A_f E_f - 1.7 f_c' b d E_f$, and $C = 1.7 f_c' f_y b d A_s - 1.7 f_c' b M_a - A_s^2 A_f^2$;

wherein the smart CFRP-SMA bar reinforced concrete structure integrating the cathodic protection, the force sensing and the bearing capacity self-adjustment comprises the ICCP system and an ICCP system deterioration enhancement system;

wherein the ICCP system comprises a reinforcing cage, the concrete, the CFRP-wrapped composite bar with the SMA embedded with the optical fiber, the steel bars, and a first external power supply, wherein the reinforcing cage is placed in the concrete, the CFRP-wrapped composite bar with the SMA embedded with the optical fiber and the steel bars are dispersed in the concrete, the CFRP winding layer of the CFRP-wrapped composite bar with the SMA embedded with the optical fiber is connected to a positive terminal of the first external power supply through a first wire, and the steel bars are connected to a negative terminal of the first external power supply through second wires;

the ICCP system deterioration enhancement system comprises a second external power supply;

a positive terminal and a negative terminal of the second external power supply are respectively connected to two ends of the plain round Fe-SMA bar of the CFRP-wrapped composite bar with the SMA embedded with the optical fiber through third wires;

the first external power supply is configured to provide a direct current (DC) power for the ICCP system; and the second external power supply is an excitation device for the plain round Fe-SMA bar;

wherein a voltage of the first external power supply ranges from 5 V to 20 V;

wherein a current of the first external power supply ranges from 200 mA to 3 A;

wherein the reinforcing cage is made of ribbed bars the smart CFRP-SMA bar reinforced concrete structure is prepared by:

placing the reinforcing cage with a built-in CFRP-wrapped composite bar with the SMA embedded with the optical fiber and built-in steel bars in a mold, pouring the concrete, and performing curing;

connecting the CFRP winding layer of the CFRP-wrapped composite bar with the SMA embedded with the optical fiber to the positive terminal of the first external power supply through the first wire, and connecting the steel bars to the negative terminal of the first external power supply through the second wires; and respectively connecting the two ends of the plain round Fe-SMA bar of the CFRP-wrapped composite bar with the SMA embedded with the optical fiber to the positive terminal and the negative terminal of the second external power supply through the third wires.

* * * * *